(12) United States Patent
McKillop et al.

(10) Patent No.: US 7,813,715 B2
(45) Date of Patent: Oct. 12, 2010

(54) AUTOMATED PAIRING OF WIRELESS ACCESSORIES WITH HOST DEVICES

(75) Inventors: Chris McKillop, La Honda, CA (US); Chris Wiebe, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 541 days.

(21) Appl. No.: 11/513,616

(22) Filed: Aug. 30, 2006

(65) Prior Publication Data

US 2008/0057890 A1   Mar. 6, 2008

(51) Int. Cl.
H04W 88/02 (2009.01)
(52) U.S. Cl. ........................ 455/410; 455/411
(58) Field of Classification Search .......... 455/410, 455/411, 414.2, 415, 421, 556.2, 557, 41.2, 455/41.3; 370/310, 338; 701/33, 115; 710/106; 711/162; 709/248; 725/62, 139, 810; 340/825.22, 340/825.72, 825.69
See application file for complete search history.

(56) References Cited

U.S. PATENT DOCUMENTS

| | | | |
|---|---|---|---|
| 3,612,265 A | 10/1971 | Dickerson | |
| 3,807,388 A | 4/1974 | Orr et al. | |
| 3,918,058 A | 11/1975 | Noyori et al. | |
| 3,958,459 A | 5/1976 | Shimomura | |
| 3,978,725 A | 9/1976 | Haditke | |
| 4,089,057 A | 5/1978 | Eriksson | |
| 4,090,216 A | 5/1978 | Constable | |
| 4,101,873 A | 7/1978 | Anderson et al. | |
| 4,114,450 A | 9/1978 | Shulman et al. | |
| 4,195,642 A | 4/1980 | Price et al. | |
| 4,210,024 A | 7/1980 | Ishiwatari et al. | |
| 4,223,211 A | 9/1980 | Allsen et al. | |
| 4,248,244 A | 2/1981 | Charnitski et al. | |
| 4,317,126 A | 2/1982 | Gragg, Jr. | |
| 4,371,188 A | 2/1983 | Hull | |
| 4,371,945 A | 2/1983 | Karr et al. | |
| 4,375,674 A | 3/1983 | Thornton | |
| 4,386,345 A | 5/1983 | Narveson et al. | |
| 4,423,630 A | 1/1984 | Morrison | |
| 4,434,801 A | 3/1984 | Jiminez et al. | |
| 4,451,849 A | 5/1984 | Fuhrer | |
| 4,516,110 A | 5/1985 | Overmyer | |
| 4,516,865 A | 5/1985 | Hideo | |
| 4,578,769 A | 3/1986 | Frederick | |

(Continued)

FOREIGN PATENT DOCUMENTS

DE   43 34 773 A1   4/1994

(Continued)

OTHER PUBLICATIONS

Partial Search Report and Invitation to Pay Fees dated Apr. 8, 2008 in PCT Application No. PCT/US2007/012033.

(Continued)

*Primary Examiner*—Diane Mizrahi
(74) *Attorney, Agent, or Firm*—Beyer Law Group LLP

(57) ABSTRACT

Techniques that facilitate pairing of wireless accessory devices with wireless host devices are disclosed. Advantageously, the improved techniques permit pairing of wireless devices without requiring user entry of pin codes. In one embodiment, a wireless accessory device, such as a headset or earphone, can be paired with a wireless host device, such as a mobile phone or media player.

28 Claims, 7 Drawing Sheets

U.S. PATENT DOCUMENTS

| | | | |
|---|---|---|---|
| 4,589,022 A | 5/1986 | Prince et al. |
| 4,625,733 A | 12/1986 | Saynajakangas |
| 4,694,694 A | 9/1987 | Vlakancic et al. |
| 4,699,379 A | 10/1987 | Chateau et al. |
| 4,703,445 A | 10/1987 | Dassler |
| 4,720,093 A | 1/1988 | Del Mar |
| 4,722,222 A | 2/1988 | Purdy et al. |
| 4,736,312 A | 4/1988 | Dassler et al. |
| 4,745,564 A | 5/1988 | Tennes et al. |
| 4,757,453 A | 7/1988 | Nasiff |
| 4,757,714 A | 7/1988 | Purdy et al. |
| 4,759,219 A | 7/1988 | Cobb et al. |
| 4,763,275 A | 8/1988 | Carlin |
| 4,763,284 A | 8/1988 | Carlin |
| 4,763,287 A | 8/1988 | Gerhaeuser et al. |
| 4,771,394 A | 9/1988 | Cavanagh |
| 4,774,679 A | 9/1988 | Carlin |
| 4,775,948 A | 10/1988 | Dial et al. |
| 4,780,837 A | 10/1988 | Namekawa |
| 4,821,218 A | 4/1989 | Potsch |
| 4,822,042 A | 4/1989 | Landsman |
| 4,824,107 A | 4/1989 | French |
| 4,829,812 A | 5/1989 | Parks et al. |
| 4,830,021 A | 5/1989 | Thornton |
| 4,862,394 A | 8/1989 | Thompson et al. |
| 4,862,395 A | 8/1989 | Fey et al. |
| 4,873,867 A | 10/1989 | McPherson et al. |
| 4,876,500 A | 10/1989 | Wu |
| 4,883,271 A | 11/1989 | French |
| 4,903,212 A | 2/1990 | Yokouchi et al. |
| 4,908,523 A | 3/1990 | Snowden et al. |
| 4,928,307 A | 5/1990 | Lynn |
| 4,935,887 A | 6/1990 | Abdalah et al. |
| 4,951,171 A | 8/1990 | Tran et al. |
| 4,955,980 A | 9/1990 | Masuo |
| 5,033,013 A | 7/1991 | Kato et al. |
| 5,036,467 A | 7/1991 | Blackburn et al. |
| 5,056,783 A | 10/1991 | Matcovich et al. |
| 5,067,081 A | 11/1991 | Person |
| 5,088,836 A | 2/1992 | Yamada et al. |
| 5,117,444 A | 5/1992 | Sutton et al. |
| 5,144,226 A | 9/1992 | Rapp |
| 5,148,002 A | 9/1992 | Kuo et al. |
| 5,150,310 A | 9/1992 | Greenspun et al. |
| 5,162,828 A | 11/1992 | Furness et al. |
| 5,181,181 A | 1/1993 | Glynn |
| 5,200,827 A | 4/1993 | Hanson et al. |
| 5,243,993 A | 9/1993 | Alexander et al. |
| 5,258,927 A | 11/1993 | Havriluk et al. |
| 5,295,085 A | 3/1994 | Hoffacker |
| 5,316,249 A | 5/1994 | Anderson |
| 5,324,038 A | 6/1994 | Sasser |
| 5,335,664 A | 8/1994 | Nagashima |
| 5,339,699 A | 8/1994 | Carignan |
| 5,343,445 A | 8/1994 | Cherdak |
| 5,348,519 A | 9/1994 | Prince et al. |
| 5,382,972 A | 1/1995 | Kannes |
| 5,396,429 A | 3/1995 | Hanchett |
| 5,406,305 A | 4/1995 | Shimomura et al. |
| 5,420,828 A | 5/1995 | Geiger |
| 5,426,595 A | 6/1995 | Picard |
| 5,436,838 A | 7/1995 | Miyamori |
| 5,446,775 A | 8/1995 | Wright et al. |
| 5,450,329 A | 9/1995 | Tanner |
| 5,452,269 A | 9/1995 | Cherdak |
| 5,471,405 A | 11/1995 | Marsh |
| 5,475,725 A | 12/1995 | Nakamura |
| 5,476,427 A | 12/1995 | Fujima |
| 5,485,402 A | 1/1996 | Smith et al. |
| 5,486,815 A | 1/1996 | Wagner |
| 5,487,006 A | 1/1996 | Kakizaki et al. |
| 5,509,082 A | 4/1996 | Toyama et al. |
| 5,513,854 A | 5/1996 | Daver |
| 5,524,637 A | 6/1996 | Erickson |
| 5,526,326 A | 6/1996 | Fekete et al. |
| 5,528,228 A | 6/1996 | Wilk |
| 5,539,336 A | 7/1996 | Nguyen et al. |
| 5,541,604 A | 7/1996 | Meier |
| 5,546,307 A | 8/1996 | Mazur et al. |
| 5,546,974 A | 8/1996 | Bireley |
| 5,559,945 A | 9/1996 | Beaudet et al. |
| 5,564,698 A | 10/1996 | Honey et al. |
| 5,574,669 A | 11/1996 | Marshall |
| 5,583,776 A | 12/1996 | Levi et al. |
| 5,583,993 A | 12/1996 | Foster et al. |
| 5,590,908 A | 1/1997 | Carr |
| 5,592,401 A | 1/1997 | Kramer |
| 5,605,336 A | 2/1997 | Gaoiran et al. |
| 5,608,698 A | 3/1997 | Yamanoi et al. |
| 5,615,132 A | 3/1997 | Horton et al. |
| 5,616,876 A | 4/1997 | Cluts |
| 5,617,084 A | 4/1997 | Sears |
| 5,617,386 A | 4/1997 | Choi |
| 5,618,995 A | 4/1997 | Otto et al. |
| 5,627,548 A | 5/1997 | Woo et al. |
| 5,629,131 A | 5/1997 | De Keyzer et al. |
| 5,633,070 A | 5/1997 | Murayama et al. |
| 5,636,146 A | 6/1997 | Flentov et al. |
| 5,646,857 A | 7/1997 | McBurney et al. |
| 5,670,985 A | 9/1997 | Cappels, Sr. et al. |
| 5,671,010 A | 9/1997 | Shimbo et al. |
| 5,671,162 A | 9/1997 | Werbin |
| 5,673,691 A | 10/1997 | Abrams et al. |
| 5,680,102 A * | 10/1997 | Xydis .................. 340/539.16 |
| 5,684,513 A | 11/1997 | Decker |
| 5,688,183 A | 11/1997 | Sabatino et al. |
| 5,690,119 A | 11/1997 | Rytky et al. |
| 5,690,591 A | 11/1997 | Kenmochi et al. |
| 5,690,773 A | 11/1997 | Fidalgo et al. |
| 5,694,340 A | 12/1997 | Kim |
| 5,701,257 A | 12/1997 | Miura et al. |
| 5,710,922 A | 1/1998 | Alley et al. |
| 5,712,638 A * | 1/1998 | Issa .......................... 341/176 |
| 5,712,949 A | 1/1998 | Kato et al. |
| 5,720,200 A | 2/1998 | Anderson et al. |
| 5,721,539 A | 2/1998 | Goetzi |
| 5,721,949 A | 2/1998 | Smith et al. |
| 5,723,786 A | 3/1998 | Klapman |
| 5,724,265 A | 3/1998 | Hutchings |
| 5,726,672 A | 3/1998 | Hernandez et al. |
| 5,734,337 A | 3/1998 | Kupersmit |
| 5,738,104 A | 4/1998 | Lo et al. |
| 5,739,451 A | 4/1998 | Winksy et al. |
| 5,740,143 A | 4/1998 | Suetomi |
| 5,743,269 A | 4/1998 | Okigami et al. |
| 5,745,037 A | 4/1998 | Guthrie et al. |
| 5,749,615 A | 5/1998 | Itson |
| 5,761,096 A | 6/1998 | Zakutin |
| 5,771,485 A | 6/1998 | Echigo |
| 5,779,576 A | 7/1998 | Smith, III et al. |
| 5,781,155 A | 7/1998 | Woo et al. |
| 5,790,477 A | 8/1998 | Hauke |
| 5,807,284 A | 9/1998 | Foxlin |
| 5,812,056 A | 9/1998 | Law |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,862,803 A | 1/1999 | Besson et al. |
| 5,864,868 A | 1/1999 | Contois |
| 5,870,710 A | 2/1999 | Ozawa et al. |
| 5,886,739 A | 3/1999 | Winningstad |
| 5,891,042 A | 4/1999 | Sham et al. |
| 5,895,073 A | 4/1999 | Moore |

| | | | | | | |
|---|---|---|---|---|---|---|
| 5,897,457 | A | 4/1999 | Mackovjak | 6,217,183 B1 | 4/2001 | Shipman |
| 5,899,963 | A | 5/1999 | Hutchings | 6,226,622 B1 | 5/2001 | Dabbiere |
| 5,901,303 | A | 5/1999 | Chew | 6,238,338 B1 | 5/2001 | DeLuca et al. |
| 5,905,460 | A | 5/1999 | Odagiri et al. | 6,245,002 B1 | 6/2001 | Belikov |
| 5,918,281 | A | 6/1999 | Nabulsi | 6,248,946 B1 | 6/2001 | Dwek |
| 5,918,303 | A | 6/1999 | Yamaura et al. | 6,249,487 B1 | 6/2001 | Yano et al. |
| 5,920,728 | A | 7/1999 | Hallowell et al. | 6,254,513 B1 | 7/2001 | Takenaka et al. |
| 5,923,757 | A | 7/1999 | Hocker et al. | 6,263,279 B1 | 7/2001 | Bianco et al. |
| 5,925,001 | A | 7/1999 | Hoyt et al. | 6,266,623 B1 | 7/2001 | Vock et al. |
| 5,929,335 | A | 7/1999 | Carter | 6,295,541 B1 | 9/2001 | Bodnar et al. |
| 5,930,741 | A | 7/1999 | Kramer | 6,298,314 B1 | 10/2001 | Blackadar et al. |
| 5,936,523 | A | 8/1999 | West | 6,305,221 B1 | 10/2001 | Hutchings |
| 5,946,643 | A | 8/1999 | Zakutin | 6,332,175 B1 | 12/2001 | Birrell et al. |
| 5,947,917 | A | 9/1999 | Carte et al. | 6,336,365 B1 | 1/2002 | Blackadar et al. |
| 5,952,992 | A | 9/1999 | Helms | 6,336,727 B1 | 1/2002 | Kim |
| 5,955,667 | A | 9/1999 | Fyfe | 6,341,316 B1 | 1/2002 | Kloba et al. |
| 5,959,568 | A | 9/1999 | Woolley | 6,356,856 B1 | 3/2002 | Damen et al. |
| 5,960,380 | A | 9/1999 | Flentov et al. | 6,357,147 B1 | 3/2002 | Darley et al. |
| 5,963,523 | A | 10/1999 | Kayama et al. | 6,360,597 B1 | 3/2002 | Hubbard, Jr. |
| 5,963,891 | A | 10/1999 | Walker et al. | 6,377,530 B1 | 4/2002 | Burrows |
| 5,976,083 | A | 11/1999 | Richardson et al. | 6,380,597 B1 | 4/2002 | Gudesen et al. |
| 5,977,877 | A | 11/1999 | McCulloch et al. | 6,385,473 B1 | 5/2002 | Haines et al. |
| 5,978,972 | A | 11/1999 | Stewart et al. | 6,436,052 B1 | 8/2002 | Nikolic et al. |
| 5,984,842 | A | 11/1999 | Chu | 6,441,747 B1 | 8/2002 | Khair et al. |
| 6,002,982 | A | 12/1999 | Fry | 6,452,610 B1 | 9/2002 | Reinhardt et al. |
| 6,006,274 | A | 12/1999 | Hawkins et al. | 6,456,261 B1 | 9/2002 | Zhang |
| 6,009,237 | A | 12/1999 | Hirabayashi et al. | 6,459,881 B1 | 10/2002 | Hoder et al. |
| 6,009,629 | A | 1/2000 | Gnepf et al. | 6,467,924 B2 | 10/2002 | Shipman |
| 6,011,491 | A | 1/2000 | Goetzl | 6,493,652 B1 | 12/2002 | Ohlenbusch et al. |
| 6,011,585 | A | 1/2000 | Anderson | 6,498,994 B2 | 12/2002 | Vock et al. |
| 6,013,007 | A | 1/2000 | Root et al. | 6,501,393 B1 | 12/2002 | Richards et al. |
| 6,018,677 | A | 1/2000 | Vidrine et al. | 6,504,483 B1 | 1/2003 | Richards et al. |
| 6,018,705 | A | 1/2000 | Gaudet et al. | 6,516,284 B2 | 2/2003 | Flentov et al. |
| 6,020,851 | A | 2/2000 | Busack | 6,527,711 B1 | 3/2003 | Stivoric |
| 6,028,625 | A | 2/2000 | Cannon | 6,529,131 B2 | 3/2003 | Wentworth |
| 6,028,627 | A | 2/2000 | Helmsderfer | 6,531,982 B1 | 3/2003 | White et al. |
| 6,032,084 | A | 2/2000 | Anderson et al. | 6,536,139 B2 | 3/2003 | Darley et al. |
| 6,032,108 | A | 2/2000 | Seiple et al. | 6,539,336 B1 | 3/2003 | Vock et al. |
| 6,032,530 | A | 3/2000 | Hock | 6,549,497 B2 | 4/2003 | Miyamoto et al. |
| 6,041,023 | A | 3/2000 | Lakhansingh | 6,560,903 B1 | 5/2003 | Darley |
| 6,043,747 | A | 3/2000 | Altenhofen | 6,563,417 B1 | 5/2003 | Shaw |
| 6,045,364 | A | 4/2000 | Dugan et al. | 6,570,526 B1 | 5/2003 | Noller et al. |
| 6,052,654 | A | 4/2000 | Gaudet et al. | 6,587,403 B1 | 7/2003 | Keller et al. |
| 6,057,756 | A | 5/2000 | Engellenner | 6,587,404 B1 | 7/2003 | Keller et al. |
| 6,059,576 | A | 5/2000 | Brann | 6,595,929 B2 | 7/2003 | Stivoric |
| 6,073,086 | A | 6/2000 | Marinelli | 6,600,418 B2 | 7/2003 | Francis et al. |
| 6,074,271 | A | 6/2000 | Derrah | 6,605,038 B1 | 8/2003 | Teller |
| 6,075,443 | A | 6/2000 | Schepps et al. | 6,611,782 B1 | 8/2003 | Wooster |
| 6,091,342 | A | 7/2000 | Janesch et al. | 6,611,789 B1 | 8/2003 | Darley |
| 6,108,426 | A | 8/2000 | Stortz | 6,617,962 B1 | 9/2003 | Horwitz et al. |
| 6,111,541 | A | 8/2000 | Karmel | 6,619,835 B2 | 9/2003 | Kita |
| 6,111,571 | A | 8/2000 | Summers | 6,621,768 B1 | 9/2003 | Keller et al. |
| 6,122,340 | A | 9/2000 | Darley et al. | 6,623,427 B2 | 9/2003 | Mandigo |
| 6,122,959 | A | 9/2000 | Hoshal et al. | 6,633,743 B1 | 10/2003 | Berlinsky |
| 6,122,960 | A | 9/2000 | Hutchings et al. | 6,643,608 B1 | 11/2003 | Hershey et al. |
| 6,125,686 | A | 10/2000 | Haan et al. | 6,714,121 B1 | 3/2004 | Moore |
| 6,127,931 | A | 10/2000 | Mohr | 6,731,312 B2 | 5/2004 | Robbin |
| 6,145,389 | A | 11/2000 | Ebeling et al. | 6,735,630 B1 | 5/2004 | Gelvin et al. |
| 6,148,271 | A | 11/2000 | Marinelli | 6,748,902 B1 | 6/2004 | Boesch et al. |
| 6,151,647 | A | 11/2000 | Sarat | 6,760,536 B1 | 7/2004 | Amir et al. |
| 6,157,898 | A | 12/2000 | Marinelli | 6,762,741 B2 | 7/2004 | Weindorf |
| 6,160,254 | A | 12/2000 | Zimmerman et al. | 6,772,331 B1 * | 8/2004 | Hind et al. .................. 713/151 |
| 6,161,944 | A | 12/2000 | Leman | 6,794,566 B2 | 9/2004 | Pachet |
| 6,163,021 | A | 12/2000 | Mickelson | 6,799,226 B1 | 9/2004 | Robbin et al. |
| 6,167,356 | A | 12/2000 | Squadron et al. | 6,801,964 B1 | 10/2004 | Mahdavi |
| 6,172,948 | B1 | 1/2001 | Keller et al. | 6,813,586 B1 | 11/2004 | Vock et al. |
| 6,179,432 | B1 | 1/2001 | Zhang et al. | 6,825,777 B2 | 11/2004 | Vock et al. |
| 6,183,425 | B1 | 2/2001 | Whalen et al. | 6,837,827 B1 | 1/2005 | Lee et al. |
| 6,191,939 | B1 | 2/2001 | Burnett | 6,856,934 B2 | 2/2005 | Vock et al. |
| 6,196,932 | B1 | 3/2001 | Marsh et al. | 6,870,529 B1 | 3/2005 | Davis |
| 6,204,813 | B1 | 3/2001 | Wadell et al. | 6,871,063 B1 | 3/2005 | Schiffer |
| 6,208,044 | B1 | 3/2001 | Viswanadham et al. | 6,876,947 B1 | 4/2005 | Darley et al. |
| 6,216,131 | B1 | 4/2001 | Liu et al. | 6,882,955 B1 | 4/2005 | Ohlenbusch et al. |

| | | |
|---|---|---|
| 6,883,694 B2 | 4/2005 | Abelow |
| 6,885,971 B2 | 4/2005 | Vock et al. |
| 6,898,550 B1 | 5/2005 | Blackadar et al. |
| 6,900,732 B2 | 5/2005 | Richards |
| 6,911,971 B2 | 6/2005 | Suzuki et al. |
| 6,914,551 B2 * | 7/2005 | Vidal ................ 341/176 |
| 6,918,677 B2 | 7/2005 | Shipman |
| 6,934,812 B1 | 8/2005 | Robbin et al. |
| 6,950,087 B2 | 9/2005 | Knox et al. |
| 6,959,259 B2 | 10/2005 | Vock et al. |
| 7,009,517 B2 | 3/2006 | Wood |
| 7,042,360 B2 | 5/2006 | Light et al. |
| 7,046,230 B2 | 5/2006 | Zadesky |
| 7,054,784 B2 | 5/2006 | Flentov et al. |
| 7,062,225 B2 | 6/2006 | White |
| 7,064,669 B2 | 6/2006 | Light et al. |
| 7,072,789 B2 | 7/2006 | Vock et al. |
| 7,084,856 B2 | 8/2006 | Huppi |
| 7,084,921 B1 | 8/2006 | Ogawa |
| 7,092,846 B2 | 8/2006 | Vock et al. |
| 7,146,437 B2 | 12/2006 | Robbin et al. |
| 7,174,130 B2 * | 2/2007 | Kurisko et al. ........ 455/41.2 |
| 7,174,277 B2 | 2/2007 | Vock et al. |
| 7,234,026 B2 | 6/2007 | Robbin et al. |
| 7,254,516 B2 | 8/2007 | Case et al. |
| 7,559,877 B2 | 7/2009 | Parks et al. |
| 2001/0022828 A1 | 9/2001 | Pyles |
| 2001/0033244 A1 * | 10/2001 | Harris et al. ............ 341/176 |
| 2001/0041021 A1 | 11/2001 | Boyle et al. |
| 2001/0042107 A1 | 11/2001 | Palm |
| 2001/0049890 A1 | 12/2001 | Hirsch et al. |
| 2002/0002413 A1 | 1/2002 | Tokue |
| 2002/0013784 A1 | 1/2002 | Swanson |
| 2002/0022551 A1 | 2/2002 | Watterson et al. |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0090912 A1 | 7/2002 | Cannon et al. |
| 2002/0116082 A1 | 8/2002 | Gudorf |
| 2002/0152045 A1 | 10/2002 | Dowling et al. |
| 2002/0161865 A1 | 10/2002 | Nguyen |
| 2002/0173273 A1 | 11/2002 | Spurgat et al. |
| 2002/0189426 A1 | 12/2002 | Hirade et al. |
| 2003/0016844 A1 * | 1/2003 | Numaoka ............ 382/100 |
| 2003/0037254 A1 | 2/2003 | Fischer et al. |
| 2003/0046434 A1 | 3/2003 | Flanagin et al. |
| 2003/0065805 A1 | 4/2003 | Barnes |
| 2003/0074457 A1 | 4/2003 | Kluth |
| 2003/0076301 A1 | 4/2003 | Tsuk et al. |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0133694 A1 | 7/2003 | Yeo |
| 2003/0163287 A1 | 8/2003 | Vock et al. |
| 2003/0167318 A1 | 9/2003 | Robbin et al. |
| 2003/0229490 A1 | 12/2003 | Etter |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0069122 A1 | 4/2004 | Wilson |
| 2004/0076086 A1 | 4/2004 | Keller et al. |
| 2004/0086120 A1 | 5/2004 | Akins, III et al. |
| 2004/0094018 A1 | 5/2004 | Ueshima et al. |
| 2004/0104845 A1 | 6/2004 | McCarthy |
| 2004/0198436 A1 | 10/2004 | Alden |
| 2004/0224638 A1 | 11/2004 | Fadell et al. |
| 2004/0267825 A1 | 12/2004 | Novak et al. |
| 2005/0015254 A1 | 1/2005 | Beaman |
| 2005/0027910 A1 * | 2/2005 | Barrett et al. ............ 710/62 |
| 2005/0080566 A1 | 4/2005 | Vock et al. |
| 2005/0088275 A1 * | 4/2005 | Valoteau et al. ......... 340/3.1 |
| 2005/0152294 A1 | 7/2005 | Yu et al. |
| 2005/0166153 A1 | 7/2005 | Eytchison et al. |
| 2005/0177929 A1 | 8/2005 | Greenwald et al. |
| 2005/0245839 A1 | 11/2005 | Stivoric et al. |
| 2005/0266798 A1 * | 12/2005 | Moloney et al. ........ 455/41.2 |
| 2005/0266961 A1 | 12/2005 | Shum et al. |
| 2006/0013414 A1 | 1/2006 | Shih |
| 2006/0068760 A1 | 3/2006 | Hameed et al. |
| 2006/0097847 A1 | 5/2006 | Bervoets et al. |
| 2006/0152377 A1 | 7/2006 | Beebe et al. |
| 2006/0190577 A1 | 8/2006 | Yamada |
| 2006/0221788 A1 | 10/2006 | Lindahl et al. |
| 2006/0265503 A1 | 11/2006 | Jones et al. |
| 2007/0011919 A1 | 1/2007 | Case, Jr. |
| 2007/0021269 A1 | 1/2007 | Shum |
| 2007/0028009 A1 | 2/2007 | Robbin et al. |
| 2007/0032195 A1 * | 2/2007 | Kurisko et al. ........ 455/41.2 |
| 2007/0124679 A1 | 5/2007 | Jeong et al. |
| 2008/0125288 A1 | 5/2008 | Case |

FOREIGN PATENT DOCUMENTS

| | | |
|---|---|---|
| DE | 44 45 023 A1 | 6/1996 |
| DE | 10325805 | 1/2005 |
| EP | 0 127 139 | 5/1984 |
| EP | 0336782 A2 | 10/1989 |
| EP | 0578604 | 1/1994 |
| EP | 0 757 437 | 2/1997 |
| EP | 0 863 469 | 9/1998 |
| EP | 0 917 077 | 5/1999 |
| EP | 0917893 B1 | 5/1999 |
| EP | 0 982 732 | 3/2000 |
| EP | 1 028 425 A2 | 8/2000 |
| EP | 1028426 A2 | 8/2000 |
| EP | 1 076 302 | 2/2001 |
| EP | 1 289 197 | 3/2003 |
| EP | 1 455 477 | 9/2004 |
| EP | 1536612 | 6/2005 |
| EP | 1566948 | 8/2005 |
| GB | 1567238 | 5/1980 |
| GB | 2137363 | 10/1984 |
| GB | 2384399 | 7/2003 |
| JP | 59-023610 | 2/1984 |
| JP | 03-152469 | 6/1991 |
| JP | 2000122044 | 4/2000 |
| JP | 2000-224099 | 8/2000 |
| JP | 2000-299834 | 10/2000 |
| JP | 2001-312338 | 11/2001 |
| JP | 2001321202 | 11/2001 |
| JP | 2002-076977 | 3/2002 |
| JP | 2002101908 | 4/2002 |
| WO | WO 01/33569 | 6/1995 |
| WO | WO 95/16950 | 6/1995 |
| WO | 98/17032 | 4/1998 |
| WO | WO 98/06466 | 12/1998 |
| WO | WO 98/54581 | 12/1998 |
| WO | WO 00/22820 | 4/2000 |
| WO | WO 00/51259 | 8/2000 |
| WO | WO 00/78170 | 12/2000 |
| WO | WO 01/01706 A1 | 4/2001 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/067202 | 8/2003 |
| WO | 2004/061850 A1 | 7/2004 |
| WO | WO 2004/055637 | 7/2004 |
| WO | WO 2004/084413 A2 | 9/2004 |
| WO | WO 2005/031737 | 4/2005 |
| WO | 2005/048644 | 5/2005 |
| WO | WO 2005/048644 | 5/2005 |
| WO | WO 2005/008505 | 7/2005 |
| WO | 2005/109781 | 11/2005 |
| WO | 2006/071364 | 6/2006 |

| | | |
|---|---|---|
| WO | WO 2006/094380 | 9/2006 |
| WO | WO 2007/022421 | 2/2007 |

OTHER PUBLICATIONS

EP98928854.3 Supplementary Search Report Feb. 18, 2002.
PCT/US98/11268 International Search Report mailed Jan. 11, 1999.
PCT/US00/18237 International Search Report; Oct. 17, 2000.
PCT/US01/51620 International Search Report mailed Sep. 25, 2002.
PCT/US00/18237 International Preliminary Examination Report; Sep. 11, 2003.
Civil Action No. 05-CV-02323; Complaint, Nov. 16, 2005.
Civil Action No. 06-CV-01100-WDM-PAC, Complaint, Jun. 8, 2000.
Civil Action No. 06-CV-01100-WDM-PAC, Defendants Polar Electro Inc.'s and Polar Electro Oy's Answer and Affirmative Defenses: Polar Electro Inc.'s Counterclaim and Demand for Jury Trial, Jun. 29, 2006.
Civil Action No. 06-CV-01447-MSK-BNB, Complaint, Jul. 26, 2006.
Civil Action No. 06-CV-01447 MSK-BNB, First Amended Complaint; Aug. 16, 2006.
Civil Action No. 06-CV-01447-MSK-BNB, Answer, Affirmative Defenses, Counterclaim, and Demand for Jury Trial, Garmin; Sep. 26, 2006.
Civil Action No. 06-CV-01447-MSK-BNB; Garmin Disclosure Statement; Sep. 26, 2006.
Civil Action No. 06-CV-01447 MSK-BNB, Answer, Affirmative Defenses, Counterclaims and Demand for Jury Trial, Timex; Sep. 26, 2006.
Civil Action No. 06-CV-01447-MSK-BNB; Timex Disclosure Statement; Sep. 26, 2006.
Civil Action No. 06-CV-01447-MSK-BNB: PhatRat Technology, Inc.'s Supplemental Answers and Objections to Defendant, Timex Corporation's Interrogatories Nos. 1, 2, 5, 7-11, 13 and 15; Feb. 12, 2007.
Civil Action No. 06-CV-02122-REB-MJW, Complaint, Oct. 24, 2006.
Civil Action No. 06-CV-02122-REB-MJW, Apple Computer, Inc.'s Answer to Complaint and Counterclaims, Jan. 22, 2007.
Civil Action No. 07-CV-00078-MSK-BNB, Complaint, Jan. 12, 2007.
Civil Action No. 07-CV-00078-MSK-BNB, Answer, Feb. 9, 2007.
Civil Action No. 07-CV-00238-REB-PAC, Complaint, Mar. 19, 2007.
Civil Action No. 07-CV-00238-REB, Apple Inc.'s Answer to Complaint, Counterclaims and Jury Demand, Mar. 19, 2007.
Civil Action No. 07-CV-00238; Nike Inc.'s Answer, Affirmative Defenses to First Complaint, March19, 2007.
U.S. Appl. No. 08/764,758, Office Action mailed Aug. 21, 1997.
U.S. Appl. No. 08/764,758, Response to Office Action mailed Aug. 21, 1997.
U.S. Appl. No. 08/764,758, Office Action mailed Dec. 15, 1998.
U.S. Appl. No. 08/764,758, Response to Office Action mailed Dec. 15, 1998.
U.S. Appl. No. 08/764,758, Office Action mailed May 8, 1998.
U.S. Appl. No. 08/764,758, Response to Office Action mailed May 8, 1998, filed Oct. 8, 1998.
U.S. Appl. No. 08/764,758, Notice of Allowance mailed Jun. 1, 1999.
U.S. Appl. No. 08/764,758, Advisory Action mailed Apr. 29, 1999.
U.S. Appl. No. 08/867,083, Office Action mailed Apr. 8, 1999.
U.S. Appl. No. 08/764,758, Rule 116 Amendment filed Apr. 8, 1999.
U.S. Appl. No. 08/764,758, Rule 116 Amendment filed May 13, 1999.
U.S. Appl. No. 08/867,083, Response to Office Action mailed Apr. 8, 1999.
U.S. Appl. No. 08/867,083, Supp. Response to Office Action mailed Apr. 8, 1999.
U.S. Appl. No. 08/867,083, Final Office Action mailed Jan. 3, 2000.
U.S. Appl. No. 08/867,083, Notice of Appeal mailed Jan. 3, 2000.
U.S. Appl. No. 08/867,083, Notice of Appeal Response to Office Action mailed Jan. 3, 2000.
U.S. Appl. No. 08/867,083, Advisory Action mailed Mar. 14, 2000.
U.S. Appl. No. 08/867,083 Office Action mailed Jun. 26, 2000.
U.S. Appl. No. 08/867,083 Amendment response to Office Action mailed Jun. 26, 2000.
U.S. Appl. No. 08/867,083 Notice of Allowance, mailed Feb. 6, 2001.
U.S. Appl. No. 09/089,232, Information Disclosure Statement Mailed Oct. 23, 1998.
U.S. Appl. No. 09/089,232, Office Action mailed Nov. 27, 1998.
U.S. Appl. No. 09/089,232, Office Action mailed May 30, 2000.
U.S. Appl. No. 09/089,232, Preliminary Amendment response to Office Action mailed May 30, 2000.
U.S. Appl. No. 09/089,232, Office Action mailed Dec. 19, 2000.
U.S. Appl. No. 09/089,232, Response to Office Action mailed Dec. 19, 2000.
U.S. Appl. No. 09/089,232, Office Action mailed Aug. 8, 2001.
U.S. Appl. No. 09/089,232, Notice of Appeal mailed Nov. 5, 2001.
U.S. Appl. No. 09/089,232, Notice of Appeal mailed Nov. 7, 2001.
U.S. Appl. No. 09/089,232, Appeal Brief mailed Jan. 2, 2002.
U.S. Appl. No. 09/089,232, Office Action mailed Apr. 26, 2002.
U.S. Appl. No. 09/089,232, Appeal Brief mailed Jul. 26, 2002.
U.S. Appl. No. 09/089,232, Notice of Allowance mailed Oct. 2, 2002.
U.S. Appl. No. 09/089,232, Comments on Allowance mailed Oct. 16, 2002.
U.S. Appl. No. 09/089,232, Office Action mailed Jan. 27, 2003.
U.S. Appl. No. 09/698,659, Office Action mailed Mar. 19, 2002.
U.S. Appl. No. 09/698,659, Response to Office Action of Mar. 19, 2002.
U.S. Appl. No. 09/698,659, Office Action mailed Nov. 21, 2002.
U.S. Appl. No. 09/698,659, Response to Office Action of Nov. 21, 2002.
U.S. Appl. No. 09/698,659, Notice of Allowance mailed Apr. 9, 2003.
U.S. Appl. No. 09/848,445, Preliminary Amendment mailed Dec. 5, 2001.
U.S. Appl. No. 09/848,445, Office Action mailed Dec. 5, 2003.
U.S. Appl. No. 09/848,445, Response to Office Action mailed Dec. 5, 2003.
U.S. Appl. No. 09/848,445, Office Action mailed May 6, 2004.
U.S. Appl. No. 09/848,445, Response to Office Action (Rule 116) mailed May 6, 2004.
U.S. Appl. No. 09/886,578, Preliminary Amendment mailed Jun. 21, 2001.
U.S. Appl. No. 09/886,578, Office Action mailed Nov. 8, 2001.
U.S. Appl. No. 09/886,578, Response to Office Action mailed Nov. 8, 2001.
U.S. Appl. No. 09/886,578, Office Action mailed Jun. 5, 2002.
U.S. Appl. No. 09/886,578, Response to Office Action mailed Jun. 5, 2002.
U.S. Appl. No. 09/886,578, Notice of Allowance mailed Sep. 9, 2002.
U.S. Appl. No. 09/992,966, Office Action mailed Feb. 3, 2003.
U.S. Appl. No. 09/992,966, Response to Office Action mailed Feb. 3, 2003.
U.S. Appl. No. 09/992,966, Office Action mailed Mar. 28, 2002.
U.S. Appl. No. 09/992,966, Response to Office Action mailed Mar. 28, 2002.
U.S. Appl. No. 09/992,966, Office Action mailed Jul. 18, 2003.
U.S. Appl. No. 09/992,966, Response to Office Action mailed Jul. 18, 2003.
U.S. Appl. No. 09/992,966, Examiner Summary mailed Oct. 27, 2003.
U.S. Appl. No. 09/992,966, Notice of Allowance mailed Apr. 15, 2004.
U.S. Appl. No. 09/992,966, Office Action mailed Jan. 6, 2004.
U.S. Appl. No. 09/992,966, Response to Office Action mailed Jan. 6, 2004.
U.S. Appl. No. 09/992,966, Notice of Allowance mailed Sep. 3, 2004.
U.S. Appl. No. 10/234,660, Office Action mailed Mar. 31, 2003.
U.S. Appl. No. 10/234,660, Response to Office Action mailed Mar. 31, 2003.
U.S. Appl. No. 10/234,660, Final Office Action mailed Oct. 31, 2003.
U.S. Appl. No. 10/234,660, Dec. 23, 2003 Response to Office Action mailed Oct. 31, 2003.
U.S. Appl. No. 10/234,660; Advisory Action mailed Jan. 27, 2004.
U.S. Appl. No. 10/234,660; Appeal Brief filed Jun. 14, 2004.
U.S. Appl. No. 10/234,660; Amendment filed Jul. 20, 2004.

U.S. Appl. No. 10/234,660; Marked up Claims by USPTO dated Jul. 28, 2004.
U.S. Appl. No. 10/234,660; Notice of Allowance; Aug. 2, 2004.
U.S. Appl. No. 10/297,270 Office Action mailed Jul. 29, 2004.
U.S. Appl. No. 10/297,270 Response to Office Action mailed Jul. 29, 2004.
U.S. Appl. No. 10/297,270 Office Action mailed Dec. 13, 2004.
U.S. Appl. No. 10/297,270 Response to Office Action mailed Dec. 13, 2004.
U.S. Appl. No. 10/297,270 Request Deletion of Named Inventors Pursuant to 37 CFR § 1.63 (d)(2) received by the Patent Office on Oct. 4, 2002.
U.S. Appl. No. 10/297,270 Office Action mailed Jul. 13, 2005.
U.S. Appl. No. 10/297,270 Response to Office Action mailed Jul. 13, 2005.
U.S. Appl. No. 10/297,270 Office Action mailed Feb. 9, 2006.
U.S. Appl. No. 10/297,270 Response to Office Action mailed Feb. 9, 2006.
U.S. Appl. No. 10/297,270 Office Action mailed Sep. 25, 2006.
U.S. Appl. No. 10/297,270 Response to Office Action mailed Sep. 25, 2006.
U.S. Appl. No. 10/297,270 Office Action mailed Jan. 11, 2007.
U.S. Appl. No. 10/297,270 Response to Office Action mailed Jan. 11, 2007.
U.S. Appl. No. 10/297,270 Office Action mailed Jul. 26, 2007.
U.S. Appl. No. 10/297,270 Response to Office Action mailed Jul. 26, 2007.
U.S. Appl. No. 10/601,208 Preliminary Amendment, mailed Jun. 20, 2003.
U.S. Appl. No. 10/601,208 Office Action mailed Jun. 15, 2004.
U.S. Appl. No. 10/601,208 Response to Office Action mailed Jun. 15, 2004.
U.S. Appl. No. 10/601,208 Office Action mailed Aug. 26, 2004.
U.S. Appl. No. 10/601,208 Response to Office Action mailed Aug. 26, 2004.
U.S. Appl. No. 10/601,208 Second Response to Office Action mailed Aug. 26, 2004.
U.S. Appl. No. 10/601,208 Office Action mailed May 11, 2005.
U.S. Appl. No. 10/601,208 Response to Office Action mailed May 11, 2005.
U.S. Appl. No. 10/601,208 Office Action mailed Feb. 15, 2006.
U.S. Appl. No. 10/601,208 Response to Office Action mailed Feb. 15, 2006.
U.S. Appl. No. 10/601,208 Office Action mailed Sep. 26, 2006.
U.S. Appl. No. 10/601,208 Response to Office Action mailed Sep. 26, 2006.
U.S. Appl. No. 10/601,208 Notice of Allowance mailed Dec. 8, 2006.
U.S. Appl. No. 10/842,947, Preliminary Amendment mailed May 11, 2004.
U.S. Appl. No. 10/842,947, Office Action mailed Nov. 30, 2004.
U.S. Appl. No. 10/842,947, Response to Office Action mailed Nov. 30, 2004.
U.S. Appl. No. 10/842,947, Office Action mailed Jun. 30, 2005.
U.S. Appl. No. 10/842,947, Response to Office Action mailed Jun. 30, 2005.
U.S. Appl. No. 10/842,947, Notice of Allowance mailed Feb. 9, 2006.
U.S. Appl. No. 10/921,743; Office Action mailed Mar. 4, 2005.
U.S. Appl. No. 10/921,743; Response to Office Action mailed Mar. 4, 2005.
U.S. Appl. No. 10/921,743; Office Action mailed May 26, 2005.
U.S. Appl. No. 10/921,743; Response to Office Action mailed May 26, 2005.
U.S. Appl. No. 10/921,743; Office Action mailed Sep. 13, 2005.
U.S. Appl. No. 10/921,743; Advisory mailed Nov. 25, 2005.
U.S. Appl. No. 10/921,743; Response to Office Action mailed 09-13-05 and Advisory mailed Nov. 25, 2005.
U.S. Appl. No. 10/921,743; Notice of Allowance; Feb. 16, 2006.
U.S. Appl. No. 10/950,897; Office Action mailed Mar. 7, 2005.
U.S. Appl. No. 10/950,897, Response to Office Action mailed Mar. 7, 2005.
U.S. Appl. No. 10/950,897, Office Action mailed Jun. 23, 2005.
U.S. Appl. No. 10/950,897, Response to Office Action mailed Jun. 23, 2005.
U.S. Appl. No. 10/950,897, Office Action mailed Sep. 9, 2005.
U.S. Appl. No. 10/950,897, Response to Office Action mailed Sep. 9, 2005.
U.S. Appl. No. 10/950,897, Office Action mailed Nov. 25, 2005.
U.S. Appl. No. 10/950,897, Response to Office Action mailed Nov. 25, 2005.
U.S. Appl. No. 10/950,897, Notice of Allowance mailed Dec. 13, 2005.
U.S. Appl. No. 11/221,029; Preliminary Amendment dated Aug. 22, 2006.
U.S. Appl. No. 11/221,029; Office Action mailed Sep. 8, 2006.
U.S. Appl. No. 11/221,029; Response to Office Action mailed Sep. 8, 2006.
U.S. Appl. No. 11/221,029; Notice of Allowance; Oct. 3, 2006.
U.S. Appl. No. 11/252,576; Notice of Allowance; Dec. 11, 2007.
U.S. Appl. No. 11/358,508; Notice of Non Compliance mailed Sep. 12, 2006.
U.S. Appl. No. 11/358,508, Preliminary Amendment mailed Mar. 30, 2006.
U.S. Appl. No. 11/358,508, Preliminary Amendment mailed May 30, 2006.
U.S. Appl. No. 11/358,508, Preliminary Amendment mailed Jul. 26, 2006.
U.S. Appl. No. 11/358,508, Office Action mailed Aug. 14, 2006.
U.S. Appl. No. 11/358,508, Response to Office Action mailed Aug. 14, 2006.
U.S. Appl. No. 11/358,508, Response to Notice mailed Sep. 12, 2006.
U.S. Appl. No. 11/358,508, Notice of Allowability & Interview Summary mailed Oct. 18, 2006.
U.S. Appl. No. 11/358,508, Rule 312 Amendment mailed Oct. 24, 2006.
U.S. Appl. No. 11,434,588: Office Action mailed Jan. 31, 2007.
U.S. Appl. No. 11,434,588; Response to Office Action mailed Jan. 31, 2007.
U.S. Appl. No. 11,434,588; Notice of Allowance; Jul. 11, 2007.
U.S. Appl. No. 11,434,588; Notice of Allowance; Nov. 6, 2007.
U.S. Appl. No. 11/484,199 Preliminary Amendment; Sep. 7, 2006.
U.S. Appl. No. 11/484,199 Notice of Allowance and Examiner Interview Summary; Oct. 6, 2006.
U.S. Appl. No. 11/598,410, Office Action mailed Jun. 13, 2007.
U.S. Appl. No. 11/598,410 Response to Office Action mailed Jun. 13, 2007.
U.S. Appl. No. 11/598,410, Notice of Allowability Sep. 26, 2007.
U.S. Appl. No. 11/646,768, Office Action mailed May 7, 2007.
U.S. Appl. No. 11/646,768, Response to Office Action mailed May 7, 2007.
U.S. Appl. No. 11/646,768, Office Action mailed Oct. 29, 2007.
U.S. Appl. No. 11/646,768, Response to Office Action mailed Oct. 29, 2007.
U.S. Appl. No. 11/646,768; Notice of Allowance; Jan. 18, 2008.
U.S. Appl. No. 11/747,081; Office Action mailed Jan. 24, 2008.
Cole, George, "The Little Label with an Explosion of Applications", Financial Times, Ltd., 2002, pp. 1-3.
Deem, "Fast Forward Go for a Ride on the World's Fastest Sailboat", Popular Mechanics, www.popularmechanics.com, Feb. 2001, pp. 1-2.
Desmarais, "Solutions in Hand", BEI Technologies, Inc., www.sensormag.com, Jan. 2001, pp. 1-2.
Desmarais et al., "How to select and use the right temperature," www.sensorsmag.com, Jan. 2001, pp. 30-36.
GPS Locator for Children, Klass Kids Foundation Jul. 15, 2004.
Henkel, Research & Developments, *Sensors*, Nov. 2000. p. 18.
Janssens et al., "Columbus: A Novel Sensor System for Domestic Washing Machines", *Sensors Magazine* Online, Jun. 2002 , pp. 1-9.
Licking, Special Report: E-Health, "This is the Future of Medicine", Business Week E.Biz, Dec. 11, 2000, pp. 77 and 78 US.
Li-Ron, Tomorrow's Cures, Health & Fitness Special Section Online, Newsweek, Dec. 10, 2001, pp. 3-10.
Martella, Product News, "Temperature Monitoring System", Nov. 2000, p. 77.
Nobbe, "Olympic Athletes Get a Boost from Technology", *Machine Design*, vol. 60, No. 19, Aug. 25, 1988.

Paradiso et al., Design and Implementation of Expressive Footwear, May 12, 2000, IBM Systems Journal, vol. 39, Nos. 3&4, pp. 511-529.
Paradiso, et al. "Instrumented Footwear for Interactive Dance" Version 1.1, Presented at the XII Colloquium on Musical Informatics, Gorizia, Italy, Sep. 24-26, 1998, pp. 1-4.
Sellers. Gear to Go, Mitch Mandel Photography, Mar. 2001, pp. 61-62.
Shannon P. Jackson and Harold Kirkham, "Weighing Scales Based on Low-Power Strain-Gauge Circuits", NASA Tech Briefs, Jun. 2001, p. 49 US.
Sharp, A Sense of the Real World, www.idsystems.com/reader/2000_09/sens0900.htm, Sep. 2000, 4 pages.
Skaloud et al., DGPS-Calibrated Accelerometric System for Dynamic Sports Events, Sep. 19-22, 2000, ION GPS 2000.
Smith et al., "Flexible and Survivable Non-Volatile Memory Data Recorder", AFRL Technology Horizons, Dec. 2000, p. 26.
Webster'S II New Riverside University Dictionary, 1988, The Riverside Publishing Company, p. 1138.
No author listed, "Your Next . . . ", Newsweek, Jun. 25, 2001, p. 52 US.
No author listed, The GPS Connection, Popular Mechanics, Feb. 2001, p. 65.
No author listed, Wireless Temperature Monitor, www.echo-on.net/mob/, Nov. 20, 2000.
Unattributed, 3M MonitorMark Indicator Data Sheet [online], [retrieved on Aug. 9, 2004], retrieved from the Internet: URL: http://www.3m.com/us/healthcare/medicalspecialties/monitor/products.html; 4 pages.
International Search Report dated Jul. 7, 2008 in PCT Application No. PCT/US2007/012033.
Written Opinion dated Jul. 7, 2008 in PCT Application No. PCT/US2007/012033.
International Search Report dated Dec. 5, 2007 in PCT Application No. PCT/US2007/004810.
International Search Report in Patent Application No. PCT/US2006/048738 dated Jan. 29, 2008.
International Search Report in Patent Application No. PCT/US2007/077020 dated Jan. 28, 2008.
International Search Report in Patent Application No. PCT/US2007/076889 dated Jan. 28, 2008.
iTunes, Wikipedia: The Free Encyclopedia; downloaded on Oct. 5, 2005, pp. 1-6.
Nutzel et al., "Sharing Systems for Future HiFi Systems", The Computer Society, Jun. 2004.
Partial Search Report dated Sep. 6, 2007 in PCT Application No. PCT/US2007/004810.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Office Action dated Feb. 1, 2008 in U.S. Appl. No. 11/327,544.
Hart-Daves, Guy. "How to Do Everything With Your iPod and iPod Mini", 2004, McGraw-Hill Professional, p. 33.
Office Action dated Feb. 4, 2008 in U.S. Appl. No. 11/566,072.
"Apple Announces iTunes 2," Press Release, Apple Computer, Inc., Oct. 23, 2001.
"Apple Introduces iTunes—World's Best and Easiest to Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.
"SoundJam MP Plus Manual, version 2.0" —MP3 Player and Encoder for Macintosh by Jeffrey Robbin, Bill Kincaid and Dave Heller, manual by Tom Negrino, published by Casady & Greene, Inc., 2000.
"12.1" 925 Candela Mobile PC, downloaded from LCDHardware.com on Dec. 19, 2002, http://www.lcdharware.com/panel/12_1_panel/default.asp.
"BL82 Series Backlit Keyboards", vvww.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth Pc Headsets; downloaded on Apr. 29, 2006 from http://www.bluetoothpcheadsets.com/connect.htm.
"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Eluminx Illuminated Keyboard", downloaded Dec. 19, 2002, http://www.elumix.com/.
"How to Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly-Optical Fiber Optic Membrane Switch Backlighting", downloaded Dec. 19, 2002, http://www.poly-optical.com/membrane_switches.html.
"Public Safety Technologies Tracer 2000 Computer", downloaded Dec. 19, 2002, http://www.pst911.com/traver.html.
"QuickTime Movie Playback Programming Guide", Apple Computer, Inc., Aug. 11, 2005.
"QuickTime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1&z....
"TAOS, Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http:www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.
"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built-in Pedometer, Oregon Scientific, downloaded on Jul. 31, 2006 from http://www2.oregonscientific.com/shop/product.asp?cid=4&scid=11&pid=581.
Adam C. Engst, "Soundlam Keeps on Jammin'," Jun. 19, 2000, http://db.tidbits.com/getbits.acgi?tbart=05988.
Alex Veiga, "AT&T Wireless Launching Music Service," Yahoo! Finance, Oct. 5, 2004, pp. 1-2.
Andrew Birrell, "Personal Jukebox (PJB)," Oct. 13, 2000, http://birrell.org/andrew/talks/pjb-overview.ppt.
Apple iPod Technical Specifications, iPod 20GB and 60GB Mac + PC, downloaded from http://www.apple.com/ipod/color/specs.html on Aug. 8, 2005.
Bociurkiw, Michael, "Product Guide: Vanessa Matz,", www.forbes.com/asap/2000/1127/vmartz_print.html, Nov. 27, 2000.
Compaq, "Personal Jukebox," Jan. 24, 2001 http://research.compaq.com/SRC/pjb/.
Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].
Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].
Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].

De Herrera, Chris, "Microsoft ActiveSync 3.1," Version 1.02, Oct. 13, 2000.
iAP Sports Lingo 0x09 Protocol V1.00, May 1, 2006.
IEEE 1394—Wikipedia, 1995, http://www.wikipedia.org/wiki/Firewire.
Int'l Application No. PCT/US2005/046797, Written Opinion of the International Searching Authority; Jul. 1, 2005.
International Search Report dated Feb. 4, 2003 in corresponding application No. PCT/US2002/033330.
International Search Report dated Jul. 7, 2007 in corresponding application No. PCT/US2006/048738.
International Search Report dated Apr. 5, 2006 from corresponding International Application No. PCT/US2005/038819.
International Search Report dated Jul. 2, 2007 in related case PCT/US2006/048669.
International Search Report dated Jun. 19, 2007 in related Application PCT/US2006/048753.
International Search Report dated May 21, 2007 from corresponding PCT Application No. PCT/US2006/048670.
International Search Report in corresponding European Application No. 06256215.2 dated Feb. 20, 2007.
Invitation to Pay Additional Fees and Partial Search Report for corresponding PCT Application No. PCT/US2005/046797 dated Jul. 3, 2006.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
Jabra Bluetooth Headset User Manual; GN Netcom A/s, 2005.
Jabra Bluetooth Introduction; GN Netcom A/S, Oct. 2004.
Jabra FreeSpeak BT200 User Manual; Jabra Corporation, 2002.
Kennedy, "Digital Data Storage Using Video Disc," IBM Technical Disclosure Bulletin, vol. 24, No. 2, Jul. 1981.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=2.
Nonhoff-Arps, et al., "Straβenmusik Portable MP3-Spieler mit USB-Anschluss," CT Magazin Fuer Computer Technik, Verlag Heinz Heise GMBH, Hannover DE, No. 25, Dec. 4, 2000.
PCT/US2005/046797; International Search Report; Nov. 24, 2006.
Personal Jukebox (PJB), "Systems Research Center and PAAD," Compaq Computer Corp., Oct. 13, 2000, http://research.compaq.com/SRC/pjb/.
Peter Lewis, "Two New Ways to Buy Your Bits," CNN Money, Dec. 31, 2003, pp. 1-4.
Sastry, Ravindra Wadali. "A Need for Speed: A New Speedometer for Runners", submitted to the Department of Electrical Engineering and Computer Science at the Massachusetts Institute of Technology, May 28, 1999.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208-212.
SoundJam MP Plus, Representative Screens, published by Casady & Greene, Inc., Salinas, CA, 2000.
Specification Sheet, iTunes 2, Apple Computer, Inc., Oct. 31, 2001.
Spiller, Karen. "Low-decibel earbuds keep noise at a reasonable level", The Telegraph Online, dated Aug. 13, 2006, http://www.nashuatelegraph.com/apps/pbcs,d11/article?Date=20060813 &Cate.. Downloaded Aug. 16, 2006.
Steinberg, "Sonicblue Rio Car," Product Review, Dec. 12, 2000, http://electronics.cnet.com/electronics/0-6342420-1304-4098389.html.
Travis Butler, "Archos Jukebox 6000 Challenges Nomad Jukebox," Aug. 13, 2001, http://db.tidbits.com/getbits.acgi?tbart=06521.
Travis Butler, "Portable MP3: The Nomad Jukebox," Jan. 8, 2001, http://db.tidbits.com/getbits.acgi?tbart=06261.
U.S. Appl. No. 11/621,541, "Personalized Podcasting Podmapping" filed Jan. 9, 2007.
U.S. Appl. No. 11/621,544, "Personalized Podcasting/Podmapping", filed Jan. 9, 2007.
Waterproof Music Player with FM Radio and Pedometer User Manual, Oregon Scientific, 2005.
Written Opinion dated Dec. 5, 2007 in PCT Application No. PCT/US2007/004810.
International Search Report dated Dec. 6, 2007 in PCT Application No. PCT/US2007/010888.
Written Opinion dated Dec. 6, 2007 in PCT Application No. PCT/US2007/010888.
Office Action dated Apr. 14, 2009 in U.S. Appl. No. 11/439,523.
Office Action dated Apr. 2, 2009 in U.S. Appl. No. 11/683,391.
Office Action dated Oct. 29, 2008 in U.S. Appl. No. 11/566,072.
Notice of Allowance dated Oct. 8, 2009 in U.S. Appl. No. 11/439,523.
Office Action dated Sep. 17, 2009 in U.S. Appl. No. 11/683,391.
Office Action dated Sep. 4, 2009 in U.S. Appl. No. 11/585,721.
Office Action dated May 13, 2009 in U.S. Appl. No. 11/585,721.
Office Action dated Jan. 27, 2010 in U.S. Appl. No. 11/585,721.
Notice of Allowance dated Dec. 31, 2009 in U.S. Appl. No. 11/683,391.

* cited by examiner

AUTOMATED PAIRING OF WIRELESS ACCESSORIES WITH HOST DEVICES

CROSS-REFERENCE TO RELATED APPLICATIONS

This application is related to: (i) U.S. patent application Ser. No. 11/245,937, filed Oct. 7, 2005, and entitled "TECHNIQUES FOR PAIRING REMOTE CONTROLLERS WITH HOST DEVICES", which is hereby incorporated by reference herein; and (i) U.S. patent application Ser. No. 11/513,692, filed concurrently, and entitled "PAIRING OF WIRELESS DEVICES USING A WIRED MEDIUM".

BACKGROUND OF THE INVENTION

1. Field of the Invention

The present invention relates to wireless devices and, more particularly, to pairing wireless devices for authorized data exchange.

2. Description of the Related Art

Traditionally, headphones or earphones are connected to an audio output device, such as a mobile phone, through a wired connection. The wired connection can, however, in many cases be cumbersome or annoying to the user. Hence, in recent times, wireless headsets or earphones have been developed. Typically, these wireless devices utilize Bluetooth technology in order to wirelessly transmit data between the headset or earphone and the mobile phone. As a result, there is no need for a wired connection between the headset or earphones and the media player.

Unfortunately, however, before the wireless headset or earphone can operate in a wireless manner with a mobile phone, the wireless headset or earphone must be paired to operate with the mobile phone. Pairing is a process that is used to associate a headset or earphone with a particular mobile phone, and vice versa. The pairing provides for secure data transfer between the devices, typically through use of encryption. Thus, the pairing helps ensure that the data being transferred is not only secured but also transferred to the appropriate recipient device. Pairing, however, requires that a pin code be entered in order to pair a mobile phone with a headset or earphone. Entering of a pin code is sometimes problematic for a user. For example, often mobile audio devices are small handheld devices and the entering of a pin code can be cumbersome given the small scale of mobile audio devices (e.g., mobile phones, portable music players, etc.). The mobile audio devices may also not offer a user interface that supports ease of entry of a pin code. Still further, users often do not know the appropriate pin code to be utilized.

Moreover, given that a mobile audio device can wirelessly pair with headsets or earphones associated with a large range of different manufacturers, a mobile audio device manufacturer has no control over the type of headset or earphones that a user might desire to pair with their mobile audio device. In limited cases, such as when the manufacturer of the mobile audio device is the same as the manufacturer of the headset or earphones, it is possible that a user need not enter a pin code because a proprietary exchange of information can facilitate pairing.

Thus, there is a need for improved techniques to facilitate pairing of wireless headsets or earphones with mobile audio devices.

SUMMARY OF THE INVENTION

The invention pertains to improved techniques that facilitate pairing of wireless accessory devices with wireless host devices. Advantageously, the improved techniques permit pairing of wireless devices without requiring user entry of pin codes.

In one embodiment, a wireless accessory device is a headset or earphone and a wireless host device is an audio output device, such as a mobile phone or media player. The media player can be a portable media player, a docking station for a portable media player, a dedicated media appliance, or a computer having media playback capabilities.

The invention can be implemented in numerous ways, including as a method, system, device, apparatus, or computer readable medium. Several embodiments of the invention are discussed below.

As a method for pairing a wireless electronic accessory device with a wireless host device, one embodiment of the invention includes at least the acts of: receiving a request to initiate pairing of the wireless host device with the wireless electronic accessory device, where the manufacturer of the wireless host device is different than the manufacturer of the wireless electronic accessory device; obtaining a potential pin code for the wireless accessory device from an electronic data storage device within the wireless host device; attempting to pair the wireless host device with the wireless electronic accessory device using the potential pin code; and completing the pairing of the wireless host device with the wireless electronic accessory device when the potential pin code matches the pin code required by the wireless electronic accessory device.

As a method for pairing a wireless electronic accessory device with a wireless host device, another embodiment of the invention includes at least the acts of: receiving a request to initiate pairing of the wireless host device with the wireless electronic accessory device; obtaining a set of potential pin codes for the wireless accessory device from an electronic data storage device; attempting to pair the wireless host device with the wireless electronic accessory device using one of the potential pin codes; repeating the attempting using another one of the potential pin codes when the one of the potential pin codes being used does not match the pin code required by the wireless electronic accessory device; and completing the pairing of the wireless host device with the wireless electronic accessory device when the one of the potential pin codes being used matches the pin code required by the wireless electronic accessory device.

As a computer readable medium including computer program code for pairing a wireless electronic accessory device with a wireless host device, one embodiment of the invention includes at least: computer program code for receiving a request to initiate pairing of the wireless host device with the wireless electronic accessory device; computer program code for obtaining a set of potential pin codes for the wireless accessory device from an electronic data storage device; computer program code for attempting to pair the wireless host device with the wireless electronic accessory device using one of the potential pin codes and repeating the attempting using another one of the potential pin codes when the one of the potential pin codes being used does not match the pin code expected by the wireless electronic accessory device; and computer program code for completing the pairing of the wireless host device with the wireless electronic accessory device when the one of the potential pin codes being used matches the pin code expected by the wireless electronic accessory device.

As a portable electronic device, one embodiment of the invention includes at least: a memory for storing data and executable computing code; a controller for operating the portable electronic device including executing the executable computing code; and a pin code database storing a plurality of potential pin codes for wireless companion devices of a plurality of different manufacturers. The executable computing code can perform pairing operations as well as other operations.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques that facilitate pairing of wireless accessory devices with wireless host devices. Advantageously, the improved techniques permit pairing of wireless devices without requiring user entry of pin codes.

In one embodiment, a wireless accessory device is a headset or earphone and a wireless host device is an audio output device, such as a mobile phone or media player. The media player can be a portable media player, a docking station for a portable media player, a dedicated media appliance, or a computer having media playback capabilities.

Embodiments of this aspect of the invention are discussed below with reference to FIGS. 1-6. However, those skilled in the art will readily appreciate that the detailed description given herein with respect to these figures is for explanatory purposes as the invention extends beyond these limited embodiments.

Figure 1:
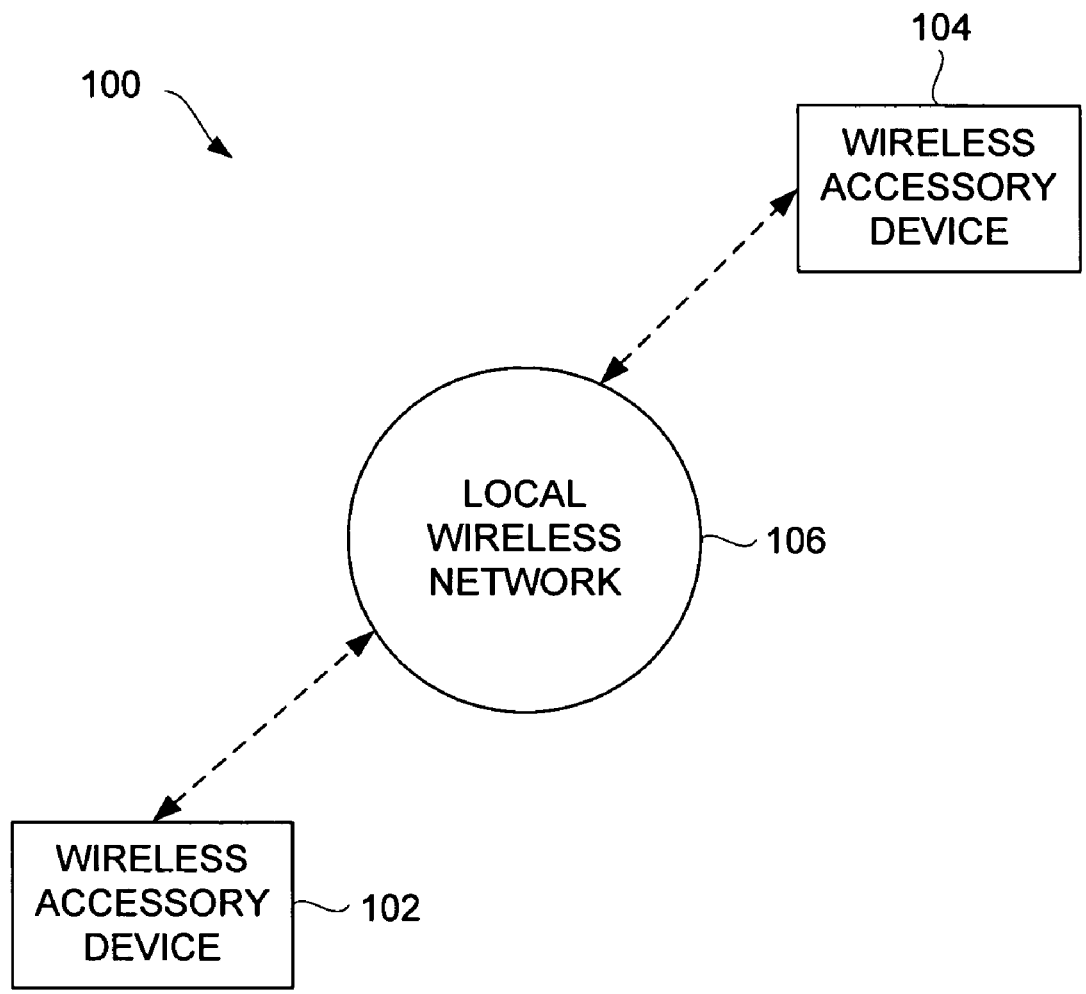
FIG. 1 is a diagram of a wireless inter-device communication system according to one embodiment of the invention.

FIG. 1 is a diagram of a wireless inter-device communication system 100 according to one embodiment of the invention. The wireless inter-device communication system 100 includes a wireless host device 102 and a wireless accessory device 104. As an example, the wireless host device 102 can pertain to a portable media device having wireless capability, and the wireless accessory device 104 can pertain to a wireless headset with wireless capability. The wireless inter-device communication system 100 also includes a local wireless network 106. The local wireless network 106 can be established by or between the wireless host device 102 and the wireless accessory device 104. The wireless host device 102 and the wireless accessory device 104 include circuitry to support transmission and reception of data via the local wireless network 106. In one embodiment, the local wireless network 106 is a Bluetooth network (i.e., short-range wireless network).

In order for the wireless host device 102 to be able to transmit or receive data to or from the wireless accessory device 104, the wireless accessory device 104 needs to be paired with the wireless host device 102. Pairing is a process that is used to associate the wireless accessory device 104 with the wireless host device 102. The pairing ensures that the data being transferred is not only secured but also transferred to the appropriate recipient device.

In general, the pairing of these devices can be performed in a substantially automated manner. As discussed in greater detail below, the wireless host device 102 will receive information about the wireless accessory device 104. Then, in order to pair the devices together, the wireless host device 102 can determine one or more potential (i.e., likely) pin codes associated with the wireless accessory device 104. Then, the wireless host device 102 can attempt to pair itself with the wireless accessory device 104 using the one or more potential pin codes. Assuming that one of the potential pin codes is the actual pin code required by the wireless accessory device 104, the pairing process is able to be completed without requiring the user of the wireless host device 102 to enter a pin code. In the event that none of the potential pin codes attempted is the required pin code for the wireless accessory device 104, the user of the wireless host device 102 can still thereafter be prompted to enter the required pin code. Once the pairing has been established, the wireless host device 102 and the wireless accessory device 104 are able to exchange data in a substantially secure manner.

In one embodiment, the pin code is used to establish a link key that is utilized by both the wireless host device 102 and the wireless accessory device 104 when encrypting data to be exchanged between these devices. Each of the devices is also able to decrypt any received encrypted data.

Figure 2:
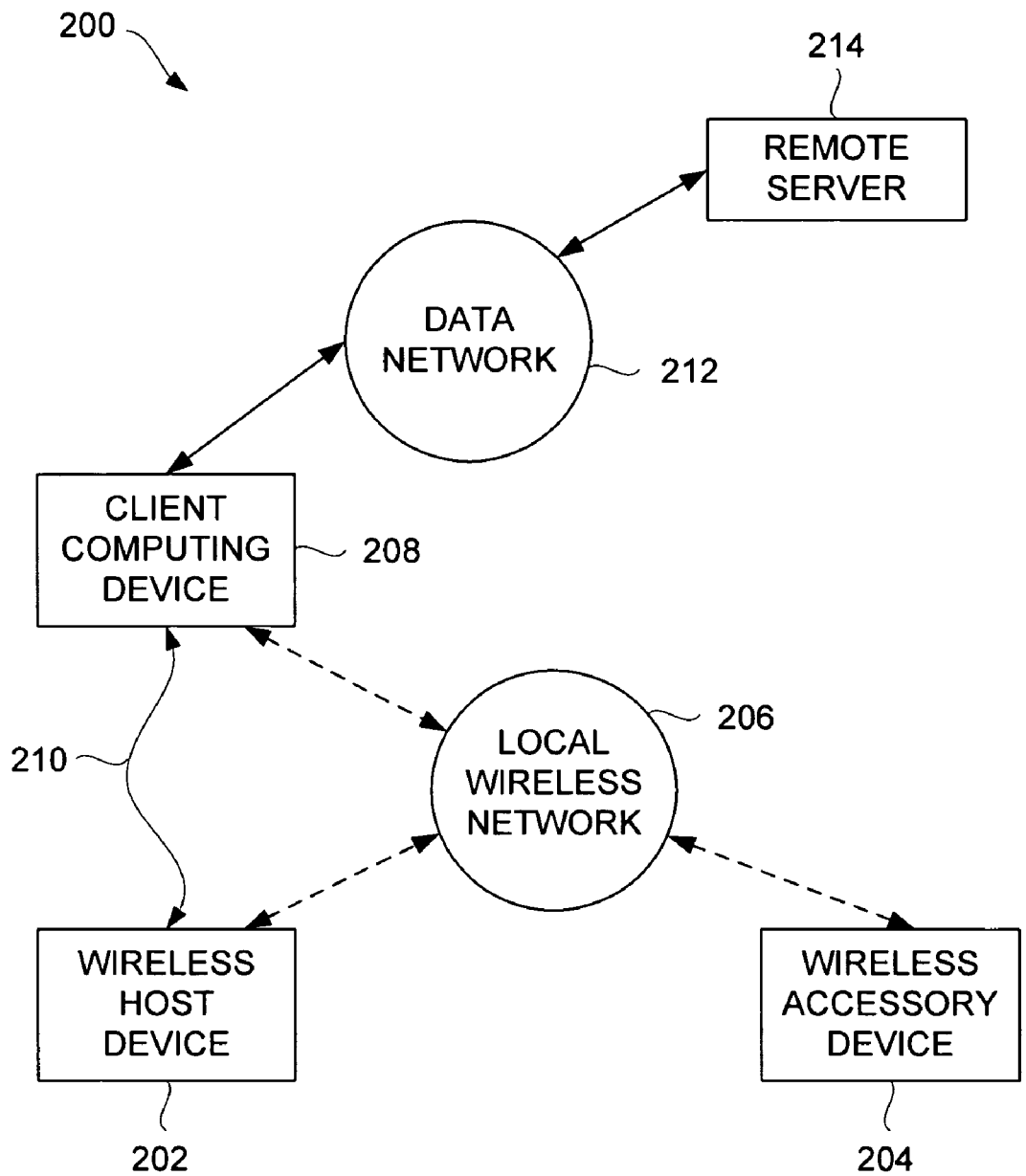
FIG. 2 is a diagram of an inter-device communication system according to another embodiment of the invention.

FIG. 2 is a diagram of an inter-device communication system 200 according to another embodiment of the invention. The inter-device communication system 200 includes a wireless host device 202 and a wireless accessory device 204. The wireless host device 202 and the wireless accessory device 204 can exchange data through a local wireless network 206. In one embodiment, the local wireless network 206 is a Bluetooth network (i.e., short-range wireless network). Similar to that noted above with respect to FIG. 1, the wireless host device 202 and the wireless accessory device 204 must first be paired before data is permitted to be exchanged in a secure manner through the local wireless network 206. As noted above, the wireless host device 202 is able to acquire one or more potential pin codes and then attempt to pair with the wireless accessory device 204 using those potential pin codes. In most cases, one of the potential pin codes will be the actual required pin code by the wireless accessory device 204 so that the pairing will successfully complete.

The inter-device communication system 200 also includes a client computing device 208. The client computing device is, for example, a personal computer. The client computing device can connect to the wireless host device 202 over a cable 210. The cable 210 is, for example, a USB cable or a Firewire cable. Alternatively, the client computing device 208 can wirelessly connect to the wireless host device 202 through the local wireless network 206. The client computing device 208 can also couple to a data network 212. The data network 212 can be a local area network, a wide area network, or a global network, such as the Internet. A remote server 214 can also couple to the data network 212.

The wireless host device 202 can receive data pertaining to potential pin codes from the client computing device 208, either via the cable 210 or via the local wireless network 206. The client computing device 208 can, in turn, receive data regarding potential pin codes from the remote server 214 via the data network 212. As such, the remote server 214 can provide potential pin codes to a wide range of client computing devices 208 via the data network 212. These various client computing devices 208 can then provide the potential pin codes to wireless host devices 202 that are associated with the client computing devices 208. In this manner, wireless host devices 202 are able to receive updated pin codes from the remote server 214, which can be useful to support future wireless accessory devices.

Figure 3:
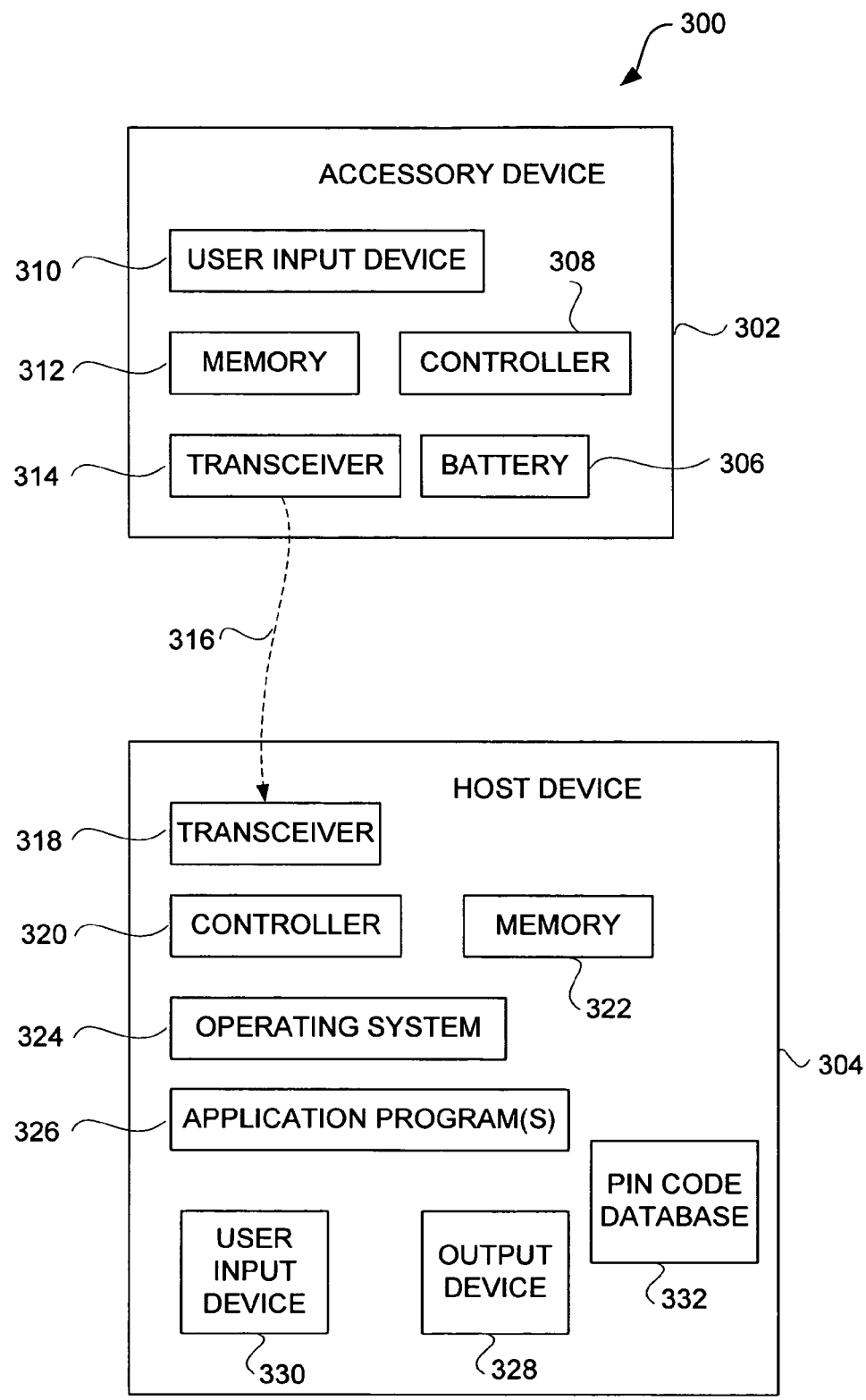
FIG. 3 is a diagram of a wireless control system according to one embodiment of the invention.

FIG. 3 is a diagram of a wireless control system 300 according to one embodiment of the invention. The wireless control system 300 includes an accessory device 302 and a host device 304. As an example, the accessory device 302 can represent the wireless accessory device 104 illustrated in FIG. 1 or the wireless accessory device 204 illustrated in FIG. 2, and the host device 304 can represent the wireless host device 102 illustrated in FIG. 1 or the wireless host device 202 illustrated in FIG. 2.

The accessory device 302 is a low power device and thus can be powered by a battery 306. The accessory device 302 also includes at least a controller 308, a user input device 310 and a memory 312. The controller 308 controls the overall operation of the accessory device 302. The user input device 310 enables a user to interact with the accessory device 302. As an example, the user input device 310 can include a button that enables a user to place the accessory device 302 into a pairing mode. The memory 312 provides persistent data storage for various elements, including program code, identifier(s), data structures, etc. Still further, the accessory device 302 includes a transceiver 314. In one embodiment, the transceiver 314 is a radio-frequency (RF) transceiver. The transceiver 314 can output a wireless transmission 316. Typically, the wireless transmission 316 is directed toward the host device 304.

The host device 304 includes a receiver 318 for the wireless transmission 316. The host device 304 includes at least a controller 320, a memory 322, an operating system 324, application program(s) 326, an output device 328 and a user input device 330. The controller 320 controls the overall operation of the host device 304. The memory 322 can be used to store persistent data, including program code (e.g., for the operating system 324 and the application program(s) 326), identifier(s), data structures, etc. The operating system 324 together with the controller 320 enables the host device 304 to not only wirelessly receive transmissions from the accessory device 302, but to also support and operate one or more application programs 326 as well as to utilize the output device 328 and the user input device 330. The host device 304 can also include a pin code database 332. The pin code database 332 can store a plurality of pin codes associated with different manufacturers, device types, and etc. During pairing, the host device can attempt to pair using one or more of the pin codes stored in the pin code database 332. Although the pin code database 332 is shown as a separate component, it should be noted that the pin code database 332 can be stored in the memory 332.

The accessory device 302 can communicate with the host device 304 over a wireless link 316. As a result of such communication, the operation of the host device 304 can be manipulated by a user of the accessory device 302. In this embodiment, the communication is uni-directional—from accessory device 302 to the host device 304. However, in other embodiments, the communication could be bi-directional.

According to one aspect of the invention, the accessory device 302 can be paired with the host device 304. When paired, the accessory device 302 is responsive to only the host device 304. Hence, if there are other host devices in the vicinity of the accessory device 302, the accessory device 302 understands to ignore wireless communications from such other host devices. In contrast, when unpaired, the accessory device 302 can be responsive to any compatible host devices in the vicinity. The host device 304 can also be paired with more than one accessory device.

Additional details are discussed below for the operations associated with pairing accessory devices to host devices. When paired, a user of the accessory device 302 can interact with the one or more application programs 326 operating on the host device 304. For example, one type of application program 326 is a media player program capable of playing digital media assets stored in the memory 322 or some other memory accessible by the host device 304. Hence, the user of the accessory device 302 can interact with the user input device 310 of the remote controller 302 to manipulate media playback controls, such as volume changes, next track, previous track, and play and pause operations associated with the media player program. For other types of application programs 326 available at the host device 304, the particular controls or commands being provided by the accessory device 302 to the host device 304 can vary widely depending upon the application.

The pin code database 332 can also be updated through user entry of pin codes or data transmission(s) to the host device 304. Through such updates to the pin code database 332, the ability to successfully pair devices can become more robust and efficient. Moreover, the automatic pairing aspects of the invention can also support newly released accessory devices that may utilize different pin codes.

Figure 4:
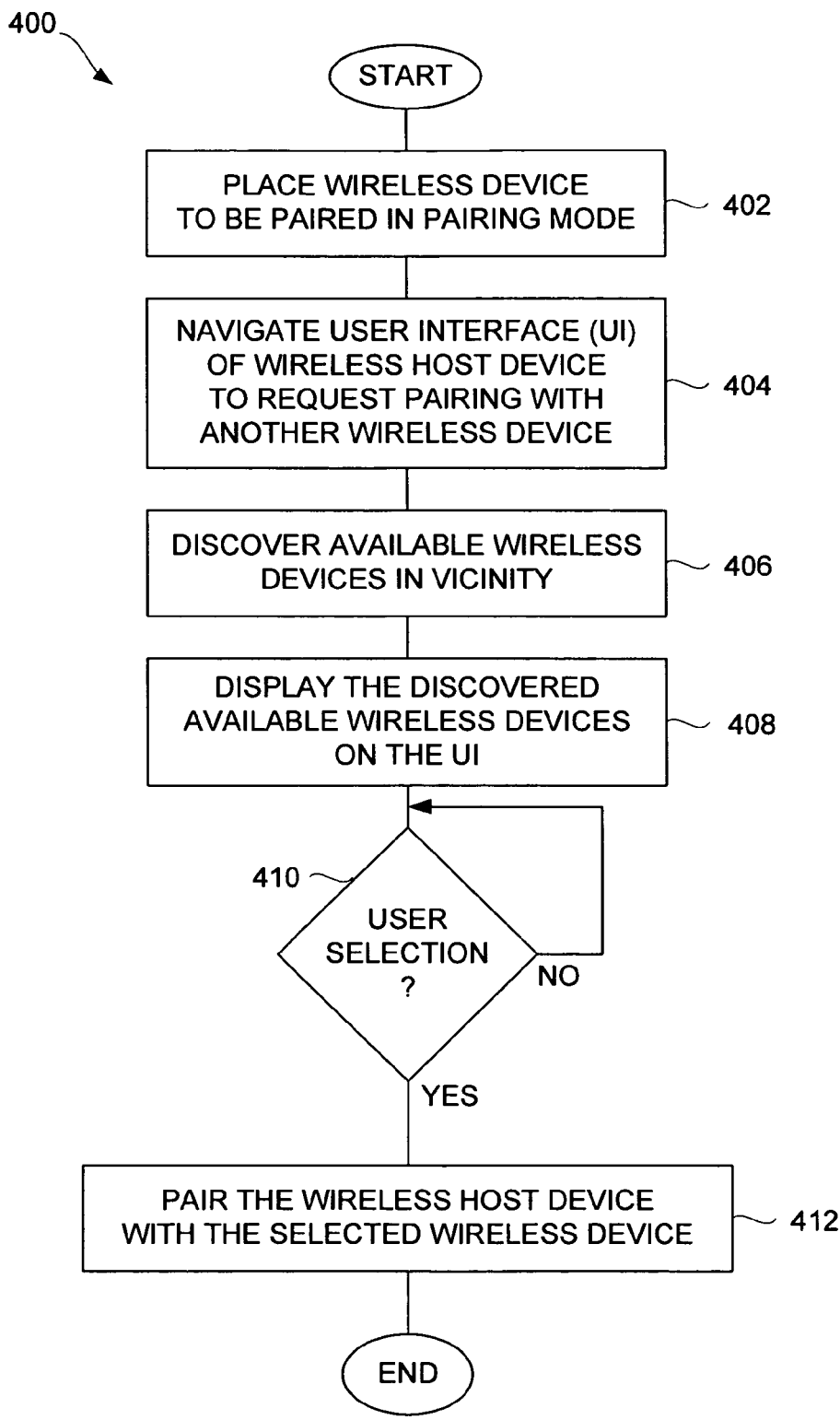
FIG. 4 is a flow diagram of a pairing initiation process according to one embodiment of the invention.

FIG. 4 is a flow diagram of a pairing initiation process 400 according to one embodiment of the invention. The pairing initiation process 400 is described with respect to a wireless host device that is to be paired with another wireless device (e.g., a wireless accessory device). The pairing initiation process 400 is, for example, performed by the wireless host device 102 illustrated in FIG. 1 or the wireless host device 202 illustrated in FIG. 2.

The pairing initiation process 400 initially places 402 a wireless device to be paired in a pairing mode. For example, a wireless accessory device can be placed in a pairing mode by physical action with respect to the wireless accessory device. In one example, a button can be pressed on the wireless accessory device to cause the wireless accessory device to enter a pairing mode. Next, a user interface (UI) of the wireless host device is navigated 404 so as to request pairing with another wireless device (e.g., the wireless accessory device). In one embodiment, the navigation 404 involves one or more selections from a graphical user interface so that the user of the wireless host device can request that pairing be performed. Once pairing has been requested, available wireless devices in the vicinity of the wireless host device are discovered 406. The discovered available wireless devices are then displayed 408 on the user interface. In one embodiment, as each of the available wireless devices is discovered, the user interface is updated as each of the available devices is discovered. Typically, the discovered available wireless devices are displayed 408 such that the user of the wireless host device can select one of the available wireless devices to be paired with. Hence, a decision 410 determines whether a user selection of one of the discovered available wireless devices has been made. When the decision 410 determines that a user selection of one of the discovered available wireless devices has not yet been made, the pairing initiation process 400 awaits such a selection.

On the other hand, when the decision 410 determines that a user has selected one of the discovered available wireless devices, the wireless host device is paired 412 with the selected wireless device. Here, in order to pair the wireless host device with the selected wireless device, a pairing processing is performed. The pairing processing is, for example, described in FIGS. 5A and 5B which are discussed in detail below. After the wireless host device has been paired 412 with the selected wireless device, the pairing initiation process 400 ends. Typically, the user interface of the wireless host device would signal the user that the pairing has successfully completed. The selected wireless device that has been paired with the wireless host device would also exit its pairing mode.

Figure 5A:
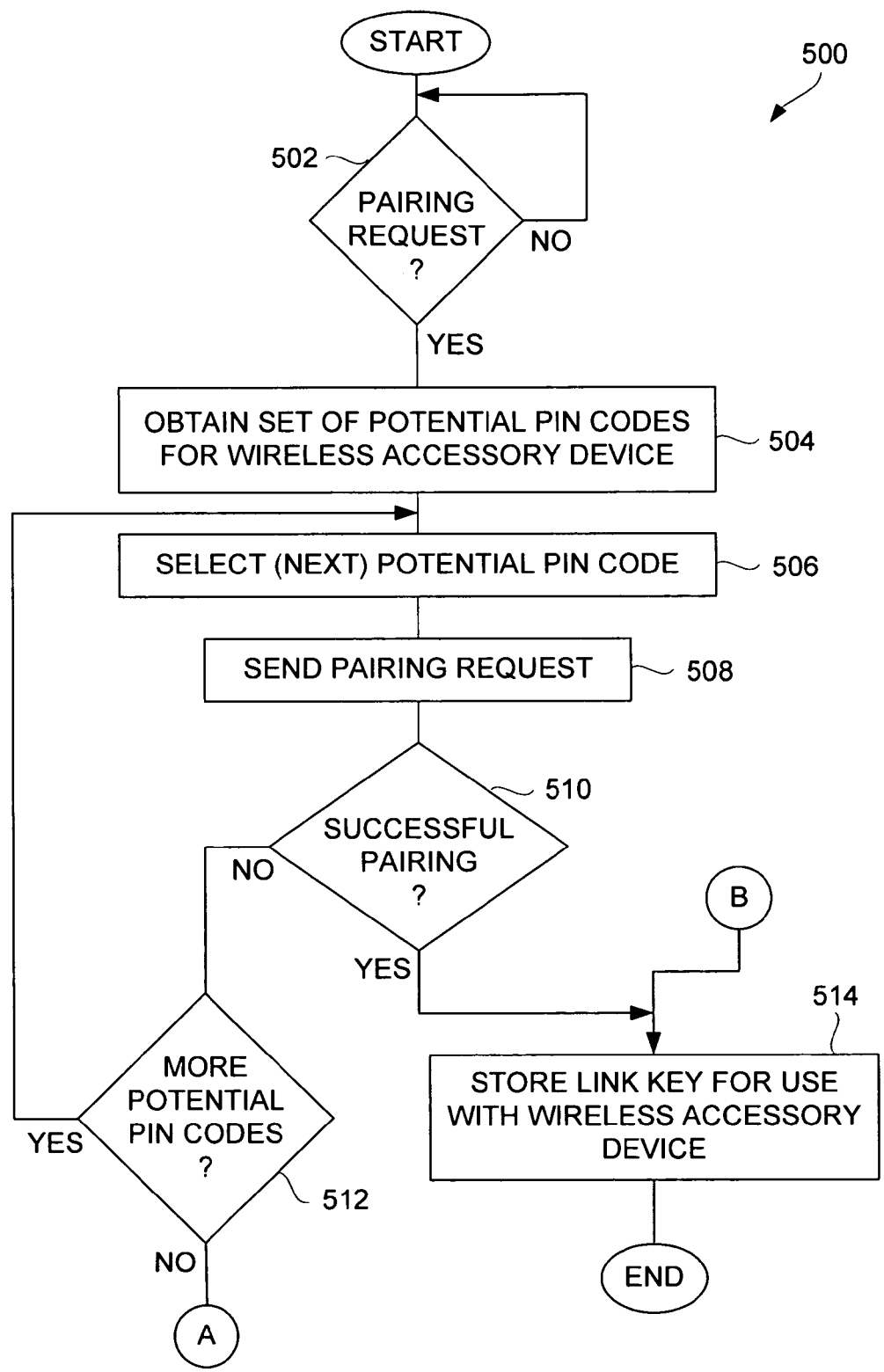
FIGS. 5A and 5B are flow diagrams of a device pairing process according to one embodiment of the invention.
Figure 5B:
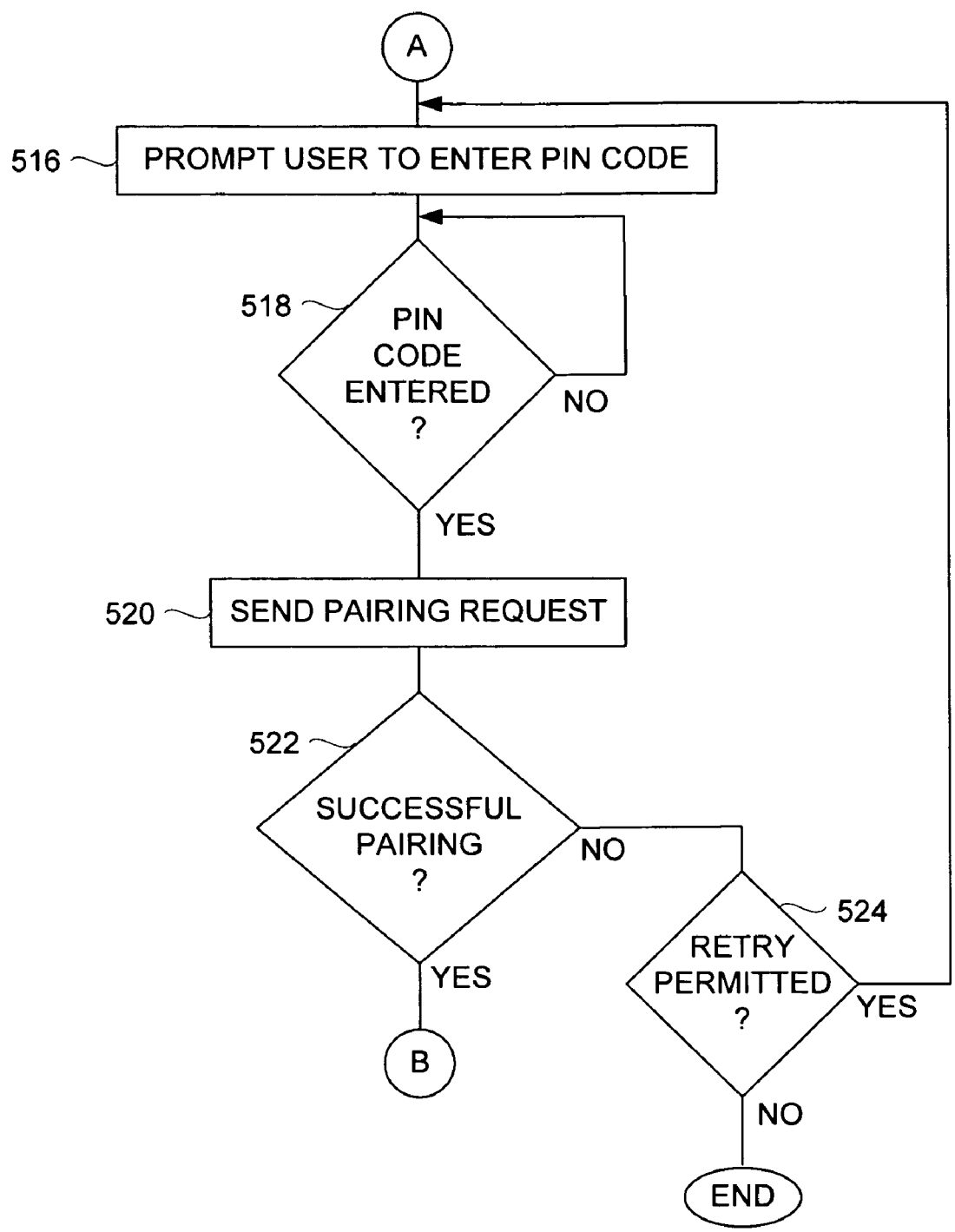

FIGS. 5A and 5B are flow diagrams of a device pairing process 500 according to one embodiment of the invention. The device pairing process 500 is, for example, performed by the wireless host device 102 illustrated in FIG. 1 or the wireless host device 202 illustrated in FIG. 2. As an example, device pairing process 500 can be associated with the blocks 410 and 412 illustrated in FIG. 4.

The device pairing process 500 begins with a pairing request 502. When the decision 502 determines that a pairing request has not been made, the device pairing process 500 awaits such a request. On the other hand, when the decision 502 determines that a pairing request has been received, the device pairing process 500 continues. In other words, the device pairing process 500 can be deemed invoked once pairing is to be performed between a wireless host device and a wireless accessory device. As an example, the block 410 illustrated in FIG. 4 can be associated with issuance of a pairing request.

Once the decision 502 determines that a pairing request has been received, a set of potential pin codes for the wireless accessory device is obtained 504. A potential pin code is then selected 506 from the set of potential pin codes. Then, a pairing request is sent 508 from the wireless host device to the wireless accessory device. A decision 510 then determines whether pairing between the wireless host device and the wireless accessory device has been successful. When the pairing has not been successful, a decision 512 determines whether there are more potential pin codes to be attempted. When the decision 512 determines that there are more potential pin codes to be attempted, the device pairing process 500 returns to repeat blocks 506-510 so that a next potential pin code can be selected and attempted. On the other hand, when the decision 510 determines that pairing has been successful, a link key for use with the wireless accessory device is stored 514. The link key is a cryptographic key that is utilized in data communication or data transfer with the wireless accessory device. The link key results from the pairing operation and facilitates the secure data transfer between the wireless host device and the wireless accessory device that are now paired. Following the block 514, the device pairing process 500 is complete and ends with the pairing being successful.

Alternatively, when the decision 512 determines that there are no more potential pin codes, then the pairing process has not been able to successfully complete using any of the potential pin codes from the set of potential pin codes. Hence, additional processing is performed to facilitate pairing. Namely, a user of the wireless host device is prompted 516 to enter a pin code. For example, the user could be prompted by a graphical user interface to enter a pin code using a alphanumeric keypad. A decision 518 then determines whether a pin code has been entered. When the decision 518 determines that a pin code has not yet been entered, the device pairing process 500 awaits entry of a pin code.

When the decision 518 determines that a pin code has been entered, a pairing request is sent 520 from the wireless host device to the accessory device. Next, a decision 522 determines whether pairing has been successful. When the decision 522 determines that pairing has not been successful, a decision 524 determines whether reentry is permitted. Here, the device pairing process 500 can limit the number of pin code entry attempts that are permitted. The decision 524 can thus determine whether additional pin code entry is permitted. When the decision 524 determines that a retry is permitted, then the device pairing process 500 returns to repeat the block 516 and subsequent blocks so that the user can attempt to pair the devices using yet another pin code that is entered. Alternatively, when the decision 524 determines that a retry is not permitted, then the device pairing process 500 ends with the devices not having been paired.

On the other hand, when the decision 522 determines that pairing has been successful following user entry of a pin code, the device pairing process 500 performs the block 514 where a link key is stored 514 for use with data exchanges between the wireless host device and the wireless accessory device that are now paired. Following the block 514, the device pairing process 500 ends with pairing being successful, albeit in this case due to a user-entered pin code.

In another embodiment of the device pairing process, in addition to storing 514 the link key at block 514, the device pairing process can store the pin code that led to the successful pairing (from either a potential pin code or a manually entered pin code). Hence, the host device can store the link key and/or the pin code for use with the wireless accessory device. The storage of these keys or codes can be done in association with network addresses, identifiers, and/or manufacturers to facilitate subsequent retrieval of the appropriate codes and/or keys. Indeed, since a host device can support more than one wireless accessory device, the host device can store link keys and/or pin codes for various accessory devices. In the event that the pairing of the host device and the wireless accessory device is lost, the pairing process can proceed (i.e., re-pair) on an automatic basis using a stored pin code (e.g., blocks 504-508).

In still another embodiment of the device pairing process, the set of potential pin codes being obtained 504 in the device pairing process 500 can be limited. In particular, when a wireless accessory device limits the number of successive attempts to enter a correct pin code, the set of potential pin codes to be attempted can be limited to not exceed the limit. More particularly, the number of potential pin codes to be attempted can be one less than the maximum number of attempts being permitted. Since many different wireless accessory device manufacturers have different limits, in one implementation, a database can store the maximum number of permitted attempts for various devices and/or manufacturers, and then the appropriate maximum number can be retrieved and utilized to limit the number of pairing requests using the pin code from the set of potential pin codes to be automatically attempted. The database can be part of or separate from the pin code database 332.

Assuming that pairing has been successful between a wireless host device and a wireless accessory device, thereafter, data transfer can be performed between the wireless host device and the wireless accessory device in a secured and controlled manner through use of the link key that was established during the pairing operation.

Figure 6:
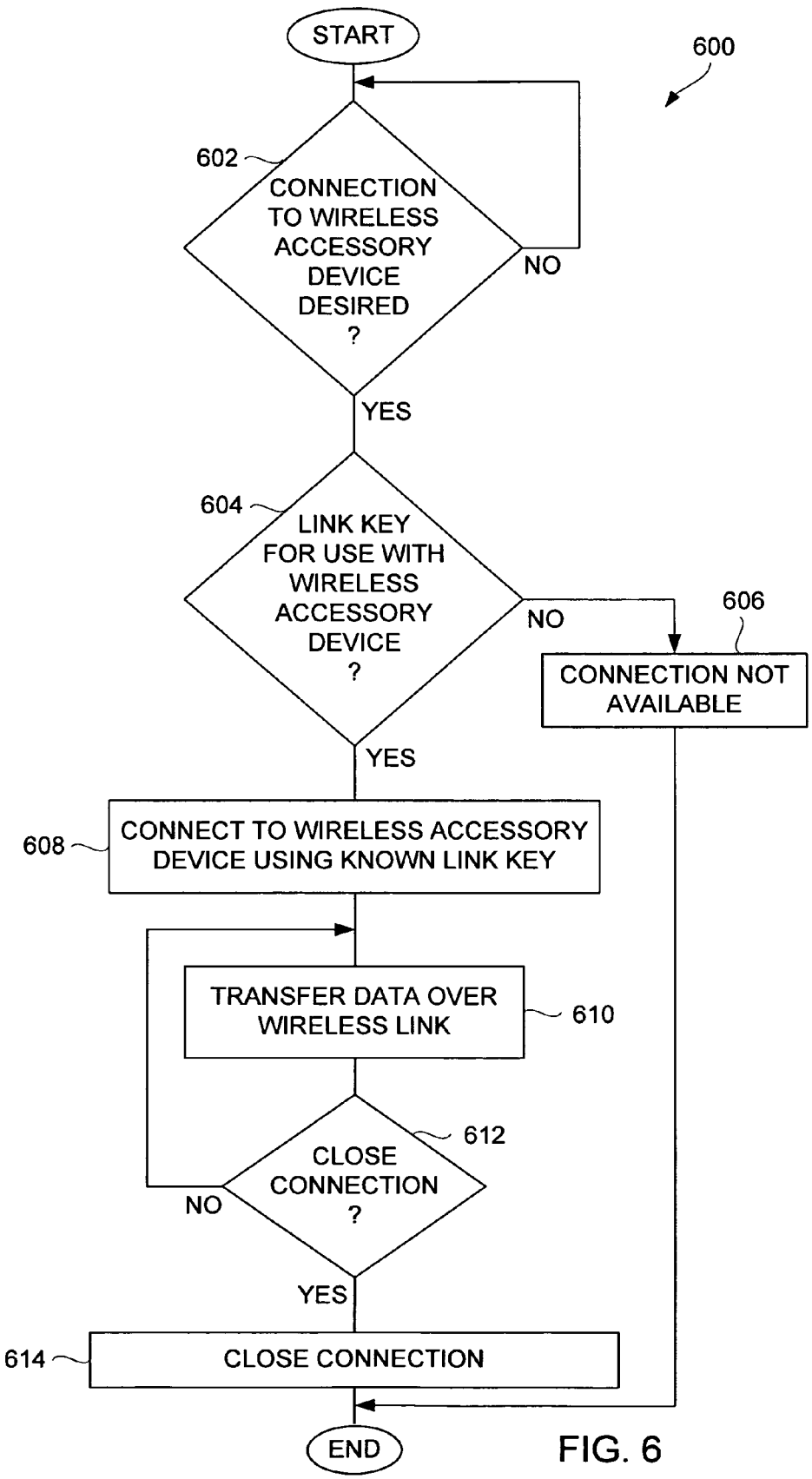
FIG. 6 is a flow diagram of wireless data transfer between a wireless host device and a wireless accessory device that have been successfully paired.

FIG. 6 is a flow diagram of wireless data transfer between a wireless host device and a wireless accessory device that have been successfully paired.

The wireless data transfer process 600 begins with a decision 602 that determines whether a connection to the wireless accessory device is desired. When the decision 602 determines that a connection from the wireless host device to the wireless accessory device is not desired, then the wireless data transfer process 600 is effectively not invoked. Alternatively, when the decision 602 determines that a connection between the wireless host device and the wireless accessory device is desired, the wireless data transfer process 600 is effectively invoked. In such case, a decision 602 determines whether the wireless host device has a link key for use with the wireless accessory device. When the wireless host device does not have such a link key, the desired connection is not available 606. Typically, in this case, the wireless host device has not been successfully paired with the wireless accessory device and thus does not have a link key that facilitates data transfer with the wireless accessory device. On the other hand, when the decision 604 determines that the wireless host device does have an appropriate link key for use with the wireless accessory device, the wireless host device connects 608 to the wireless accessory device using the known link key. With the connection being established, data can then be transmitted over a wireless link provided by the connection between the wireless host device and the wireless accessory device. Next, a decision 612 determines whether the connection is to be closed. When the decision 612 determines that the connection is not to be closed, data transfer over a wireless link can continue to be transferred 610. As an example, the wireless accessory device can be a headset and the wireless host device can be a media player or cellular phone. In either case, the user can use the headset to interact with the media player or cellular phone in a wireless manner. Alternatively, when the decision 612 determines that the connection should be closed, the connection is then closed 614. Following the block 614, as well as following the block 606, the wireless data transfer process 600 ends.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that wireless device can be paired without any need for a user enter a pin code that is often not readily available to the user. In other words, pairing of wireless devices can be achieved in a substantially automated manner. Another advantage of the invention is that a wireless host device can provide a data storage with potential pin codes that can be intelligently selected and attempted for pairing other wireless devices, such as wireless accessory devices. Still another advantage of the invention is that potential pin codes' storage in the data storage of the wireless host device can be updated by a remote server which can provide additional potential codes.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for securely pairing a wireless electronic accessory device with a wireless portable electronic device, said method comprising:
    (a) receiving at the wireless portable electronic device a pairing request from the wireless electronic accessory device, the manufacturer of the wireless portable electronic device being different than the manufacturer of the wireless electronic accessory device;
    (b) selecting a set of potential pin codes for the wireless electronic accessory device by the wireless portable electronic device from an electronic data storage device within the wireless portable electronic device;
    (c) sending from the wireless portable electronic device a first pairing request to the wireless electronic accessory device using a first potential pin code in the selected set of potential pin codes;
    (d) sending from the wireless portable electronic device a second pairing request to the wireless electronic accessory device using a second potential pin code in the selected set of potential pin codes when the first potential pin code does not match an actual pin code required by the wireless electronic accessory device; and
    (e) receiving a response at the wireless portable electronic device from the wireless electronic accessory device confirming successful pairing when the first or second potential pin code matches the actual pin code required by the wireless electronic accessory device.

2. The method as recited in claim 1, further comprising:
    (f) prompting a user of the wireless portable electronic device to enter an alternative pin code when the first and second potential pin codes do not match the actual pin code required by the wireless electronic accessory device.

3. The method as recited in claim 1, further comprising:
    selecting the set of potential pin codes based on a device type or a manufacturer of the wireless electronic accessory device.

4. The method as recited in claim 3 wherein the set of potential pin codes are selected from a plurality of pin codes that have been pre-stored in the electronic data storage device within the wireless portable electronic device.

5. The method as recited in claim 1, further comprising:
    storing a plurality of potential pin codes organized based on a manufacturer or a device type in a database in the electronic data storage device within the wireless portable electronic device.

6. The method as recited in claim 5, further comprising:
    selecting the set of potential pin codes by accessing the database within the wireless portable electronic device based on a device type or a manufacturer of the wireless electronic accessory device.

7. The method as recited in claim 1, further comprising:
    storing a reference to the actual pin code in the electronic data storage device within the wireless portable electronic device when the first of second potential pin code matches the actual pin code required by the wireless electronic accessory device.

8. The method of pairing recited in claim 1, wherein the wireless portable electronic device does not have a physical alphanumeric keyboard input.

9. A method for securely pairing a wireless electronic accessory device with a wireless portable electronic device, said method comprising:
   (a) receiving at the wireless portable electronic device a pairing request from the wireless electronic accessory device;
   (b) selecting a set of potential pin codes for the wireless electronic accessory device from an electronic data storage device external to the wireless electronic accessory device;
   (c) sending from the wireless portable electronic device a pairing request to the wireless electronic accessory device using one of the potential pin codes in the set of potential pin codes;
   (d) repeating said sending (c) using another one of the potential pin codes in the set of potential pin codes when the one of the potential pin codes being used does not match the actual pin code required by the wireless electronic accessory device; and
   (e) receiving a response at the wireless portable electronic device from the wireless electronic accessory device confirming successful pairing when one of the potential pin codes matches the actual pin code required by the wireless electronic accessory device.

10. The method as recited in claim 9,
   wherein the set of potential pin codes are selected based on a device type or a manufacturer of the wireless electronic accessory device.

11. The method as recited in claim 9,
   wherein the electronic data storage device stores a plurality of potential pin codes organized based on a manufacturer or a device type.

12. The method as recited in claim 11,
   wherein the electronic data storage device storing the plurality of pin codes is a database.

13. The method as recited in claim 12,
   wherein selecting the set of pin codes includes accessing the database based on a device type or a manufacturer of the wireless electronic accessory device.

14. The method as recited in claim 9, further comprising:
   (f) prompting a user of the wireless portable electronic device to enter an alternative pin code when none of the potential pin codes match the actual pin code required by the wireless electronic accessory device.

15. The method as recited in claim 14, further comprising:
   (g) storing the entered alternative pin code at the wireless portable electronic device or the wireless electronic accessory device.

16. The method as recited in claim 9,
   wherein the manufacturer of the wireless portable electronic device differs from the manufacturer of the wireless electronic accessory device.

17. The method as recited in claim 9, further comprising:
   (f) storing a reference to the actual pin code in the electronic data storage device when the one of the potential pin codes matches the actual pin code required by the wireless electronic accessory device.

18. The method as recited in claim 9,
   wherein the wireless portable electronic device is at least one of a mobile communication device and a portable media player.

19. The method of pairing recited in claim 9, wherein the wireless portable electronic device does not have a physical alphanumeric keyboard input.

20. The method as recited in claim 9,
   wherein repeating said sending (c) using another one of the potential pin codes in the set of potential pin codes is limited to a maximum number of attempts.

21. The method as recited in claim 20,
   wherein the maximum number of attempts is based on a manufacturer or a device type.

22. A portable electronic device, comprising:
   a memory for storing data and a pin code database for storing a plurality of potential pin codes for wireless companion devices of a plurality of different manufacturers; and
   a controller for operating said portable electronic device, the operating including pairing securely a wireless companion device with the portable electronic device by,
   receiving a pairing request from the wireless electronic companion device having a different manufacturer than the portable electronic device,
   selecting a potential pin code for the wireless companion device by the portable electronic device from the pin code database;
   sending from the portable electronic device, a pairing request to the wireless companion device using the selected potential pin code; and
   receiving a response at the portable electronic device from the wireless companion device confirming successful pairing when the selected potential pin code matches the actual pin code required by the wireless companion device.

23. The portable electronic device as recited in claim 22,
   wherein the operating further includes the controller repeating the sending using another potential pin code when the potential pin code being used does not match the actual pin code required by the wireless companion device.

24. The portable electronic device as recited in claim 22 further comprising:
   a graphical user interface, the graphical user interface including a menu item that on selection initiates a pairing operation.

25. The portable electronic device as recited in claim 22,
   wherein the pin code database stores a plurality of pin codes organized based on a manufacturer or a device type.

26. The portable electronic device as recited in claim 22, the portable electronic device being at least one of a mobile communication device and a portable media player.

27. The portable electronic device of claim 22, wherein the portable electronic device does not have a physical alphanumeric keyboard input.

28. The portable electronic device of claim 22,
   wherein the operating further includes the controller updating the pin code database in the portable electronic device by retrieving additional potential pin codes from a remote server.

* * * * *